US007650216B2

(12) United States Patent
Itoh et al.

(10) Patent No.: US 7,650,216 B2
(45) Date of Patent: Jan. 19, 2010

(54) VEHICLE DRIVING SYSTEM WITH ADAPTIVE SKID CONTROL

(75) Inventors: Kohei Itoh, Hitachiohta (JP); Norikazu Matsuzaki, Mito (JP)

(73) Assignee: Hitachi, Ltd., Tokyo (JP)

( * ) Notice: Subject to any disclaimer, the term of this patent is extended or adjusted under 35 U.S.C. 154(b) by 367 days.

(21) Appl. No.: 11/349,971

(22) Filed: Feb. 9, 2006

(65) Prior Publication Data
US 2006/0219454 A1 Oct. 5, 2006

(30) Foreign Application Priority Data
Mar. 31, 2005 (JP) .............................. 2005-101391

(51) Int. Cl.
B60T 8/1761 (2006.01)
B60K 28/16 (2006.01)
(52) U.S. Cl. ......................................... 701/74; 180/197
(58) Field of Classification Search ............. 701/71–81; 180/197
See application file for complete search history.

(56) References Cited

U.S. PATENT DOCUMENTS

| 3,776,355 | A | | 12/1973 | Scherenberg |
| 4,850,446 | A | * | 7/1989 | Leiber et al. ................. 180/197 |
| 4,999,778 | A | * | 3/1991 | Ruhl et al. ..................... 701/74 |
| 5,047,941 | A | | 9/1991 | Seki |
| 5,079,709 | A | | 1/1992 | Hirako et al. |
| 5,117,934 | A | * | 6/1992 | Tsuyama et al. ............. 180/197 |
| 5,168,950 | A | * | 12/1992 | Krusche ....................... 180/197 |
| 5,181,175 | A | * | 1/1993 | Shiraishi et al. ............... 701/90 |
| 5,428,541 | A | * | 6/1995 | Miyata et al. ................. 701/85 |
| 5,765,657 | A | * | 6/1998 | Fukumura et al. ............ 180/197 |
| 6,141,618 | A | * | 10/2000 | Yamashita et al. ............. 701/84 |
| 6,533,367 | B1 | * | 3/2003 | Latarnik, deceased et al. ............. 303/139 |
| 6,564,138 | B1 | * | 5/2003 | Schmitt et al. ................. 701/82 |
| 6,816,769 | B2 | * | 11/2004 | Polzin ......................... 701/78 |
| 6,882,921 | B2 | * | 4/2005 | Priemer et al. ................ 701/86 |
| 6,952,638 | B2 | * | 10/2005 | Sauter ......................... 701/84 |
| 7,377,349 | B2 | * | 5/2008 | Hommi et al. .............. 180/197 |

(Continued)

FOREIGN PATENT DOCUMENTS

EP      0 543 255 A1      5/1993

(Continued)

OTHER PUBLICATIONS

European Search Report dated Aug. 1, 2006 (Five (5) pages).

(Continued)

*Primary Examiner*—Thomas G Black
*Assistant Examiner*—Shelley Chen
(74) *Attorney, Agent, or Firm*—Crowell & Moring LLP

(57) ABSTRACT

A differentiator calculates the acceleration of the rear wheels. An acceleration threshold calculation means enable the skid-detection acceleration threshold to be adjusted corresponding to the conditions of the vehicle. An acceleration skid-detection means make a comparison between the acceleration of the wheels obtained by the differentiator and the skid-detection acceleration threshold adjusted by the acceleration threshold calculation means, and determine whether or not a skid of the wheels has occurred, based upon the comparison result. Such an arrangement provides a vehicle driving force system having a function of detecting a skid even in a case that a skid of the wheels has occurred at a low acceleration of the vehicle.

4 Claims, 14 Drawing Sheets

U.S. PATENT DOCUMENTS

| | | | |
|---|---|---|---|
| 2003/0221889 A1* | 12/2003 | Sauter | 180/197 |
| 2004/0098188 A1* | 5/2004 | Priemer et al. | 701/82 |
| 2004/0167701 A1* | 8/2004 | Mattson et al. | 701/71 |
| 2005/0284679 A1* | 12/2005 | Hommi et al. | 180/197 |
| 2006/0219454 A1* | 10/2006 | Itoh et al. | 180/197 |
| 2008/0120006 A1* | 5/2008 | Hommi et al. | 701/84 |

FOREIGN PATENT DOCUMENTS

| | | |
|---|---|---|
| EP | 1 147 937 A2 | 10/2001 |
| JP | 62-3137 A | 1/1987 |
| JP | 05016780 A * | 1/1993 |
| JP | 7-323753 A | 12/1995 |
| JP | 10-141104 | 5/1998 |
| JP | 11-241624 A | 9/1999 |
| JP | 2001-239853 A | 9/2001 |
| JP | 2004-352129 A | 12/2004 |
| JP | 2005-20830 A | 1/2005 |
| JP | 2005-51834 A | 2/2005 |

OTHER PUBLICATIONS

Japanese Office Action dated Jan. 13, 2009 (Four (4) pages).

* cited by examiner

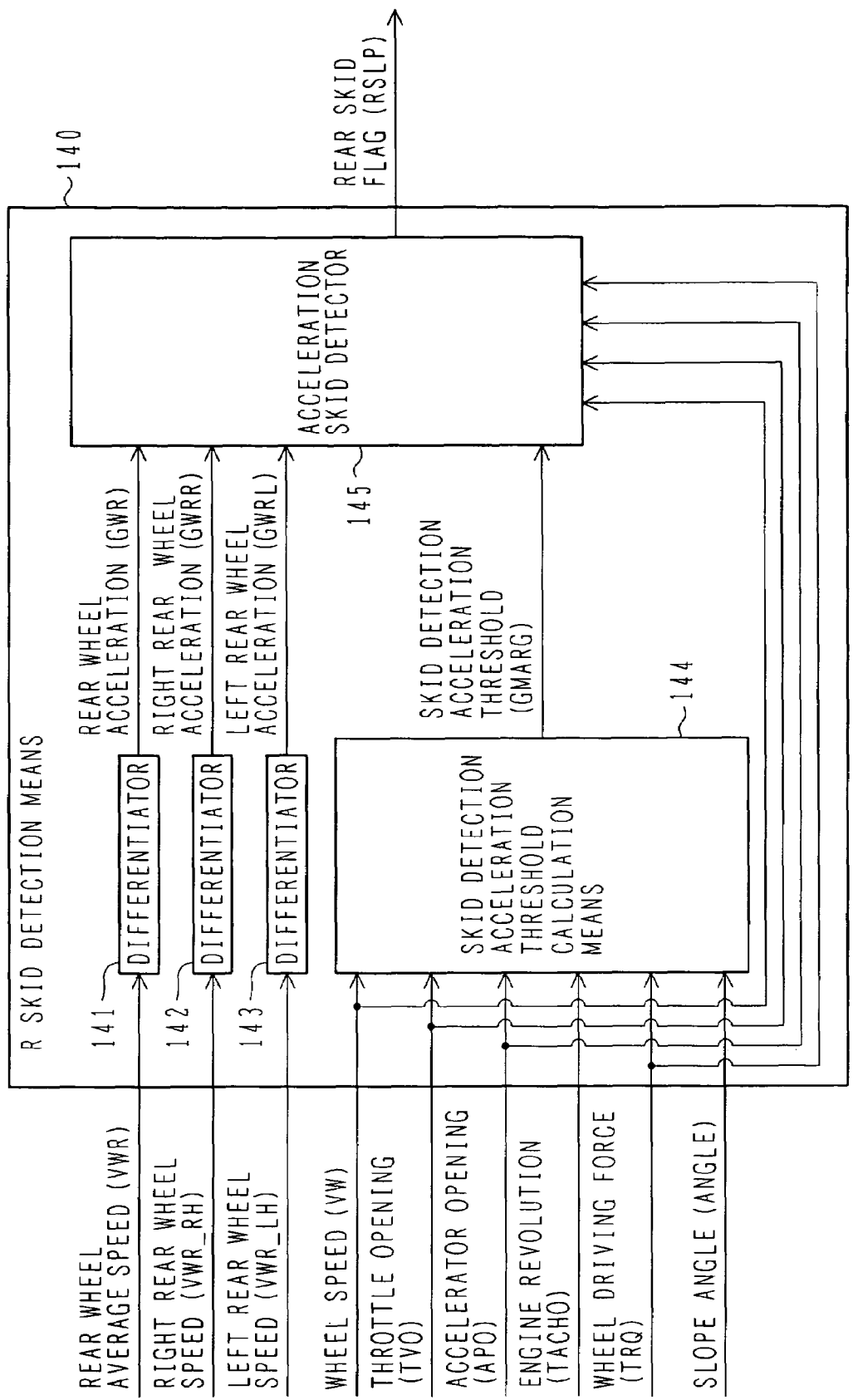

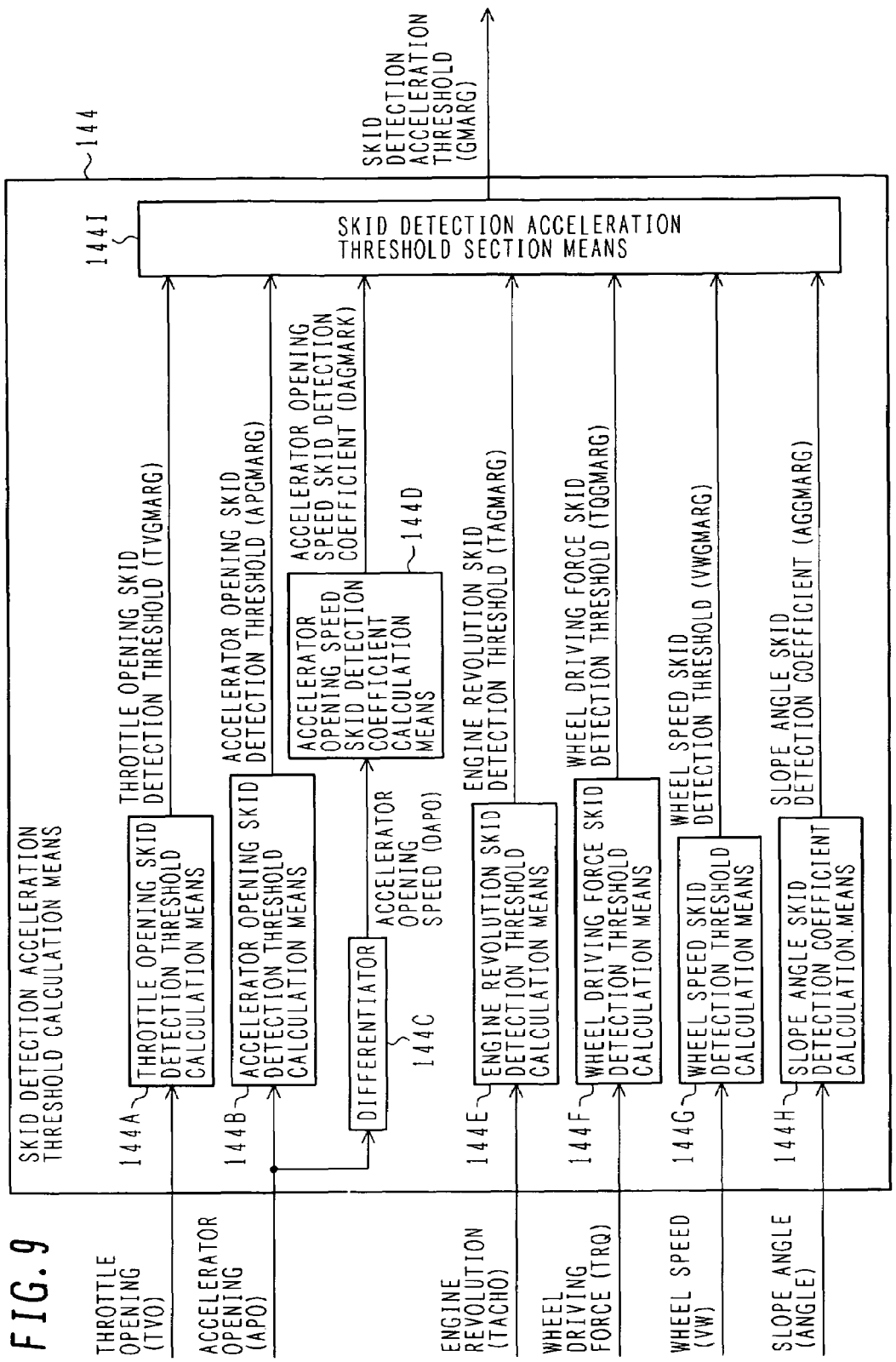

VEHICLE DRIVING SYSTEM WITH ADAPTIVE SKID CONTROL

BACKGROUND OF THE INVENTION

1. Field of the Invention

The present invention relates to a vehicle driving system for controlling driving force from a driving source so as to drive a vehicle, and particularly to a suitable vehicle driving force system having a function of detecting a skid of the wheels.

2. Description of the Related Art

As a conventional method for detecting the skid of the wheels, a method is known in which, in a case of detection of the change in the wheel speed (wheel acceleration) exceeding a predetermined detection threshold, determination is made that a skid of the wheels has occurred, as disclosed in JP-A-10-141104, for example.

In general, the aforementioned detection threshold is set to a value equal to or greater than the acceleration of the wheels in the state in which the vehicle is driven at a full throttle on a dry and descending slope. The reason is that the wheel acceleration occurring under such conditions is not due to a skid of the wheels. Accordingly, the detection threshold should be set to a value equal to or greater than the maximum wheel acceleration which can occur in the normal driving state in which the vehicle is driven without any skid. Otherwise, the aforementioned conditions can lead to a faulty determination that a skid of the wheels has occurred.

SUMMARY OF THE INVENTION

However, the method disclosed in JP-A-10-141104 has the disadvantage as follows. Let us consider a skid at a low acceleration, i.e., a skid which occurs slowly. In some cases, the change in the wheel speed (wheel acceleration) due to such a skid does not reach the predetermined detection threshold. Accordingly, the conventional system cannot detect such a skid, leading to poor stability in vehicle operation. Furthermore, this leads to a problem of poor starting performance and poor hill-climbing ability of the vehicle. In order to solve such a problem, let us consider an arrangement in which the detection threshold used for determination whether or not a skid has occurred is reduced. While such an arrangement can detect such a skid with a low acceleration, in some cases, such an arrangement makes a faulty determination that a skid of the wheels has occurred in a case that the vehicle is driven at full accelerator on a dry and descending slope. Accordingly, there is a demand for the vehicle driving system to have a function of detecting a skid of the wheels in a sure manner while preventing fault detection.

It is an object of the present invention to provide a vehicle driving force system including skid detecting means which enables detection of a skid of the wheels even in a case of a skid occurring at a low acceleration.

(1) In order to solve the aforementioned problems, according to a first aspect of the present invention, a vehicle driving force system used for a vehicle having a configuration in which a driving force output from a driving source is transmitted to wheels, comprises: wheel speed detection means for detecting the wheel speed of the vehicle; acceleration calculation means for calculating the acceleration of each wheel based upon the wheel speed detected by the wheel speed detection means; acceleration skid detection means having a function of determining whether or not a skid of the wheels has occurred based upon the comparison result between the acceleration of the wheels obtained by the acceleration detection means and a predetermined skid-detection acceleration threshold for detection of a skid of the wheels; and acceleration threshold adjustment means which enable the skid-detection acceleration threshold to be adjusted corresponding to the conditions of the vehicle.

Such an arrangement enables detection of a skid even in a case that a skid has occurred at a low acceleration.

(2) According to the aforementioned (1), the vehicle driving force system preferably includes throttle opening detection means for detecting the throttle opening of an engine. With such an arrangement, the acceleration threshold adjustment means adjust the skid-detection acceleration threshold corresponding to the throttle opening detected by the throttle opening detection means.

(3) With the vehicle driving force system according to the aforementioned (2), the acceleration threshold adjustment means preferably raise the skid-detection acceleration threshold corresponding to an increase in the throttle opening detected by the throttle opening detection means. On the other hand, the acceleration threshold adjustment means preferably lower the skid-detection acceleration threshold corresponding to a reduction in the throttle opening detected by the throttle opening detection means.

(4) According to the aforementioned (1), the vehicle driving force system preferably includes accelerator opening detection means for detecting the accelerator opening level of an accelerator pedal. With such an arrangement, the acceleration threshold adjustment means adjust the skid-detection acceleration threshold corresponding to the accelerator opening detected by the accelerator opening detection means.

(5) With the vehicle driving force system according to the aforementioned (4), the acceleration threshold adjustment means preferably raise the skid-detection acceleration threshold corresponding to an increase in the accelerator opening detected by the accelerator opening detection means, and wherein the acceleration threshold adjustment means preferably lower the skid-detection acceleration threshold corresponding to a reduction in the accelerator opening detected by the accelerator opening detection means.

(6) According to the aforementioned (1), the vehicle driving force system preferably includes: accelerator opening detection means for detecting the accelerator opening level of an accelerator pedal; and accelerator opening speed calculation means for calculating the accelerator opening speed based upon the accelerator opening detected by the accelerator opening detection means. With such an arrangement, the acceleration threshold adjustment means adjust the skid-detection acceleration threshold corresponding to the accelerator opening speed calculated by the accelerator opening speed calculation means.

(7) With the vehicle driving force system according to the aforementioned (6), the acceleration threshold adjustment means preferably raise the skid-detection acceleration threshold corresponding to an increase in the accelerator opening speed calculated by the accelerator opening speed calculation means. On the other hand, the acceleration threshold adjustment means preferably lower the skid-detection acceleration threshold corresponding to a reduction in the accelerator opening speed calculated by the accelerator opening speed calculation means.

(8) According to the aforementioned (1), the vehicle driving force system preferably includes engine revolution detection means for detecting the engine revolution. With such an arrangement, the acceleration threshold adjustment means adjust the skid-detection acceleration threshold corresponding to the engine revolution detected by the engine revolution detection means.

(9) With the vehicle driving force system according to the aforementioned (8), the acceleration threshold adjustment means preferably raise the skid-detection acceleration threshold corresponding to an increase in the engine revolution detected by the engine revolution detection means. On the other hand, the acceleration threshold adjustment means preferably lower the skid-detection acceleration threshold corresponding to a reduction in the engine revolution detected by the engine revolution detection means.

(10) According to the aforementioned (1), the vehicle driving force system preferably includes driving force calculation means for calculating the driving force which is output from the driving source and which is transmitted to the wheels. With such an arrangement, the acceleration threshold adjustment means adjust the skid-detection acceleration threshold corresponding to the driving force detected by the driving force calculation means.

(11) With the vehicle driving force system according to the aforementioned (10), the acceleration threshold adjustment means preferably raise the skid-detection acceleration threshold corresponding to an increase in the driving force detected by the driving force calculation means. On the other hand, the acceleration threshold adjustment means preferably lower the skid-detection acceleration threshold corresponding to a reduction in the driving force detected by the driving force calculation means.

(12) With the vehicle driving force system according to the aforementioned (1), the acceleration threshold adjustment means preferably adjust the skid-detection acceleration threshold corresponding to the wheel speed detected by the wheel speed detection means.

(13) With the vehicle driving force system according to the aforementioned (12), the acceleration threshold adjustment means preferably lower the skid-detection acceleration threshold corresponding to an increase in the wheel speed detected by the wheel speed detection means. On the other hand, the acceleration threshold adjustment means preferably raise the skid-detection acceleration threshold corresponding to a reduction in the wheel speed detected by the wheel speed detection means.

(14) With the vehicle driving force system according to the aforementioned (12), the acceleration threshold adjustment means preferably lower the skid-detection acceleration threshold in a case that there is a difference between the front wheel speed and the rear wheel speed detected by the wheel speed detection means.

(15) With the vehicle driving force system according to the aforementioned (1), the acceleration threshold adjustment means preferably include slope angle detection means for calculating the slope angle of the road. With such an arrangement, the skid-detection acceleration threshold is adjusted corresponding to the slope angle of the road detected by the slope angle detection means.

(16) With the vehicle driving force system according to the aforementioned (15), the acceleration threshold adjustment means preferably lower the skid-detection acceleration threshold corresponding to an increase in the slope angle of the road detected by the slope angle detection means. On the other hand, the acceleration threshold adjustment means preferably raise the skid-detection acceleration threshold corresponding to a reduction in the slope angle of the road detected by the slope angle detection means.

(17) According to the aforementioned (1), the vehicle driving force system preferably includes speed-reduction determination means for determining whether or not the speed of the vehicle is being reduced. With such an arrangement, the skid-detection is stopped during a period of time in which the speed-reduction determination means determine that the speed of the vehicle is being reduced.

(18) In order to solve the aforementioned problems, according to a second aspect of the present invention, a vehicle driving force system used for a vehicle having a configuration in which a driving force output from a driving source is transmitted to wheels, comprises: wheel speed detection means for detecting the wheel speed of the vehicle; acceleration calculation means for calculating the acceleration of each wheel based upon the wheel speed detected by the wheel speed detection means; acceleration skid detection means having a function of determining whether or not a skid of the wheels has occurred based upon the comparison result between the acceleration of the wheels obtained by the acceleration detection means and a predetermined skid-detection acceleration threshold for detection of a skid of the wheels; and acceleration threshold adjustment means which enable the skid-detection acceleration threshold to be adjusted corresponding to any one of the throttle opening of the engine, the accelerator opening, the accelerator opening speed, the engine revolution, the driving force, the wheel speed, and the slope angle of the road.

Such an arrangement enables detection of a skid even in a case that a skid has occurred at a low acceleration.

(19) In order to solve the aforementioned problems, with a vehicle driving system according to a third aspect of the present invention, in a case that the acceleration of the wheels is greater than a first wheel acceleration, the driving force of the driving source is controlled such that the acceleration of the wheels is reduced to the first wheel acceleration. On the other hand, in a case that the acceleration of the wheels is smaller than a first wheel acceleration, the driving force of the driving source is controlled such that the acceleration of the wheels matches a second wheel acceleration which is smaller than the first wheel acceleration.

Such an arrangement enables detection of a skid even in a case that a skid has occurred at a low acceleration.

(20) In order to solve the aforementioned problems, according to a fourth aspect of the present invention, an electric driving device for a multi-wheel drive vehicle, having a configuration in which at least one of multiple wheels is driven by an internal combustion engine, and at least one of the other wheels is driven by a electric motor, the electric driving device comprises: the electric motor for generating driving force using electric power; a power supply for the electric motor; and a control device including control means having a function of controlling the electric motor so as to control the output from the electric motor applied to the wheels for handling a skid of the wheels. With such an arrangement, in a case that the acceleration of the wheels is greater than a first wheel acceleration, the control means control the driving force of the electric motor such that the acceleration of the wheels is reduced to the first wheel acceleration. On the other hand, in a case that the acceleration of the wheels is smaller than a first wheel acceleration, the control means control the driving force of the electric motor such that the acceleration of the wheels matches a second wheel acceleration which is smaller than the first wheel acceleration.

Such an arrangement enables detection of a skid even in a case that a skid has occurred at a low acceleration.

According to the present invention, a skid can be detected even in a case that a skid has occurred at a low acceleration.

BRIEF DESCRIPTION OF THE DRAWINGS

FIG. 8 is a block diagram which shows a configuration of R skid detection means included in electric motor torque target value calculation means of a vehicle driving force system according to an embodiment of the present invention;

FIG. 9 is a block diagram which shows a configuration of skid detection acceleration threshold calculation means included in electric motor torque target value calculation means of a vehicle driving force system according to an embodiment of the present invention;

DESCRIPTION OF THE PREFERRED EMBODIMENTS

Description will be made regarding a configuration and operation of a vehicle driving force system according to an embodiment of the present invention with reference to FIGS. 1 through 17.

First, description will be made regarding an overall configuration of a four-wheel drive vehicle using the vehicle driving force system according to the present embodiment with reference to FIG. 1.

Figure 1:
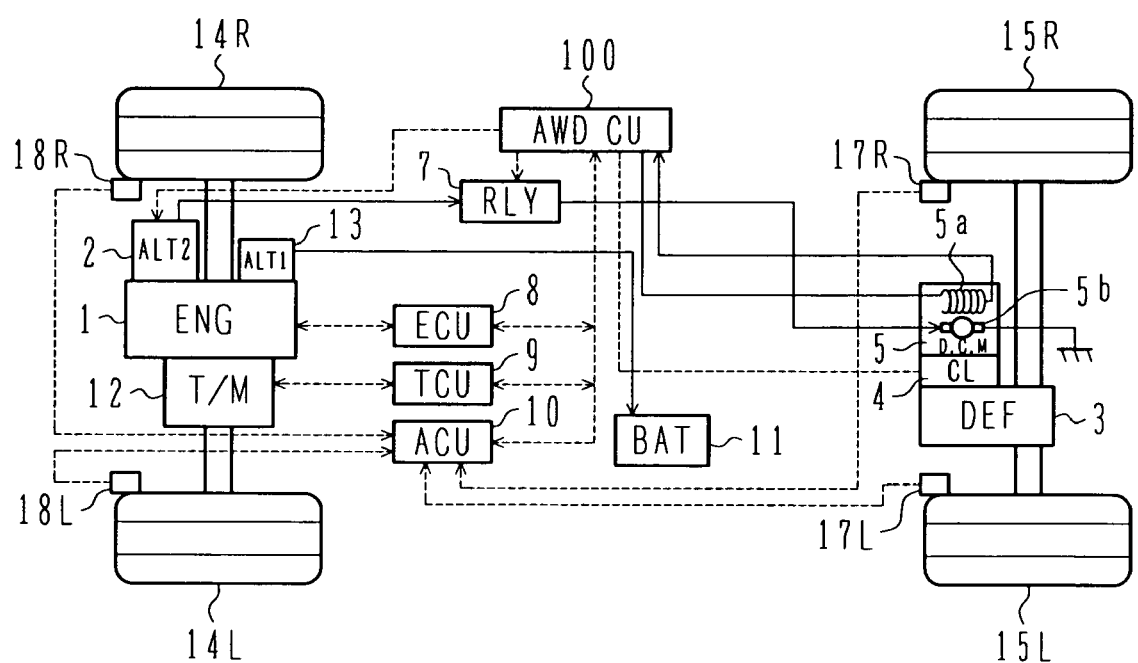
FIG. 1 is a system block diagram which shows an overall configuration of a four-wheel drive vehicle employing a vehicle driving force system according to an embodiment of the present invention.

FIG. 1 is a system block diagram which shows an overall configuration of the four-wheel drive vehicle using the vehicle driving force system according to an embodiment of the present invention.

The four-wheel drive vehicle includes an engine (ENG) 1 and an electric motor 5. The driving force of the engine (ENG) 1 is transmitted to the left and right front wheels 14R and 14L through a transmission 12 and a first axle shaft, thereby driving the front wheels 14L and 14R.

The driving force of the electric motor 5 is transmitted to the left and right rear wheels 15L and 15R through a clutch (CL) 4, differential gear 3, and second axle shaft, thereby driving the rear wheels 15L and 15R. Specifically, upon connecting the clutch (CL) 4 to the differential gear 3, the torque of the electric motor 5 is transmitted to the rear wheel shaft through the clutch (CL) 4 and the differential gear 3, thereby driving the rear wheels 15L and 15R. Upon disengaging the clutch (CL) 4 from the differential gear 3, the electric motor 5 is mechanically separated from the rear wheels 15L and 15R, whereby the rear wheels 15L and 15R are not driven. A four-wheel drive control unit (4WDCU) 100 controls engagement/disengagement of the clutch (CL) 4. Note that a DC shunt-wound motor or a separately excited motor is employed as the electric motor 5, which enables switching between forward and reverse rotation in a simple manner.

Description has been made regarding an arrangement in which the front wheels 14L and 14R are driven by the engine (ENG) 1, and the rear wheels 15L and 15R are driven by the electric motor 5. Also, an arrangement may be made in which the front wheels 14L and 14R are driven by the electric motor 5, and the rear wheels 15L and 15R are driven by the engine (ENG) 1. Also, the present invention may be applied to an arrangement having no electric motor, e.g., a mechanical four-wheel drive vehicle including driving adjustment means for the front and rear wheels and a propeller shaft for connecting therebetween.

The engine compartment includes an auxiliary generator (ALT 1) 13 and an auxiliary battery (BAT) 11 serving as a usual generating and charging system. The auxiliary generator (ALT1) 13 is driven by the engine (ENG) 1 through a belt. The output of the auxiliary generator 13 is charged in the auxiliary battery (BAT) 11.

Furthermore, a driving high-powered generator (ALT2) 2 is provided near the auxiliary generator (ALT1) 13. The driving high-powered generator (ALT2) 2 is driven by the engine (ENG) 1 through a belt, thereby generating electric power. The electric motor 5 is driven by the electric power thus output. The 4WDCU 100 controls the electric power generated by the driving high-powered generator (ALT2) 2. The torque of the electric motor, which is the output of the electric motor 5, is controlled by adjusting the electric power generated by the driving high-powered generator (ALT2) 2. Specifically, the 4WDCU 100 outputs an instruction signal (i.e., a duty signal for instructing the generator (alternator) to output a predetermined amount of field current), thereby controlling the electric power generated by the driving high-powered generator (ALT2) 2. The electric power generated by the driving high-powered generator (ALT2) 2 is applied to an armature coil 5$b$ of the electric motor 5, thereby controlling the output (electric motor torque) of the electric motor 5. That is to say, the 4WDCU 100 outputs an output instruction value (duty signal for adjusting the field current value applied to the generator (alternator), to a desired value) to the driving high-powered generator (ALT2) 2, so as to control the output (electric motor torque) of the electric motor 5. In a range in which the electric motor 5 is driven at an even higher revolution speed, the 4WDCU 100 reduces the field current applied to a field coil 5$a$ in order to directly control the electric motor 5. This enables the electric motor 5 to operate at a high revolution speed.

The output of the engine (ENG) 1 is controlled by an electronic control throttle driven according to instructions from an engine control unit (ECU) 8. The engine (ENG) 1 includes a throttle opening sensor for detecting the opening amount of the throttle, an engine revolution sensor for detecting the revolution of the engine, and an accelerator opening sensor for detecting the operation amount of the accelerator pedal, which are not shown in the drawings. The outputs of these sensors are acquired by the 4WDCU 100. On the other hand, a transmission controller (TCU) 9 controls the transmission 12.

The front wheels 14L and 14R, and the rear wheels 15L and 15R, include wheel speed sensors 16L and 16R, and 17L and 17R, respectively, for detecting the revolution speed thereof. On the other hand, a break includes an antilock break actuator controlled by an antilock break control unit (ACU) 10.

Signal exchange may be made between the 4WDCU 100 and each of the engine control unit (ECU) 8, the transmission control unit (TCU) 9, the antilock break control unit (ACU) 10, and the interfaces of other control units, through an in-vehicle LAN (CAN) bus, instead of ordinary signal lines.

The driving high-powered generator (ALT2) 2 is connected with the electric motor 5 through a large-capacity relay (RLY) 7. This enables the output of the driving high-powered generator 2 to be turned on/off. The turning on/off of the relay (RLY) 7 is controlled by the 4WDCU 100.

Figure 2:
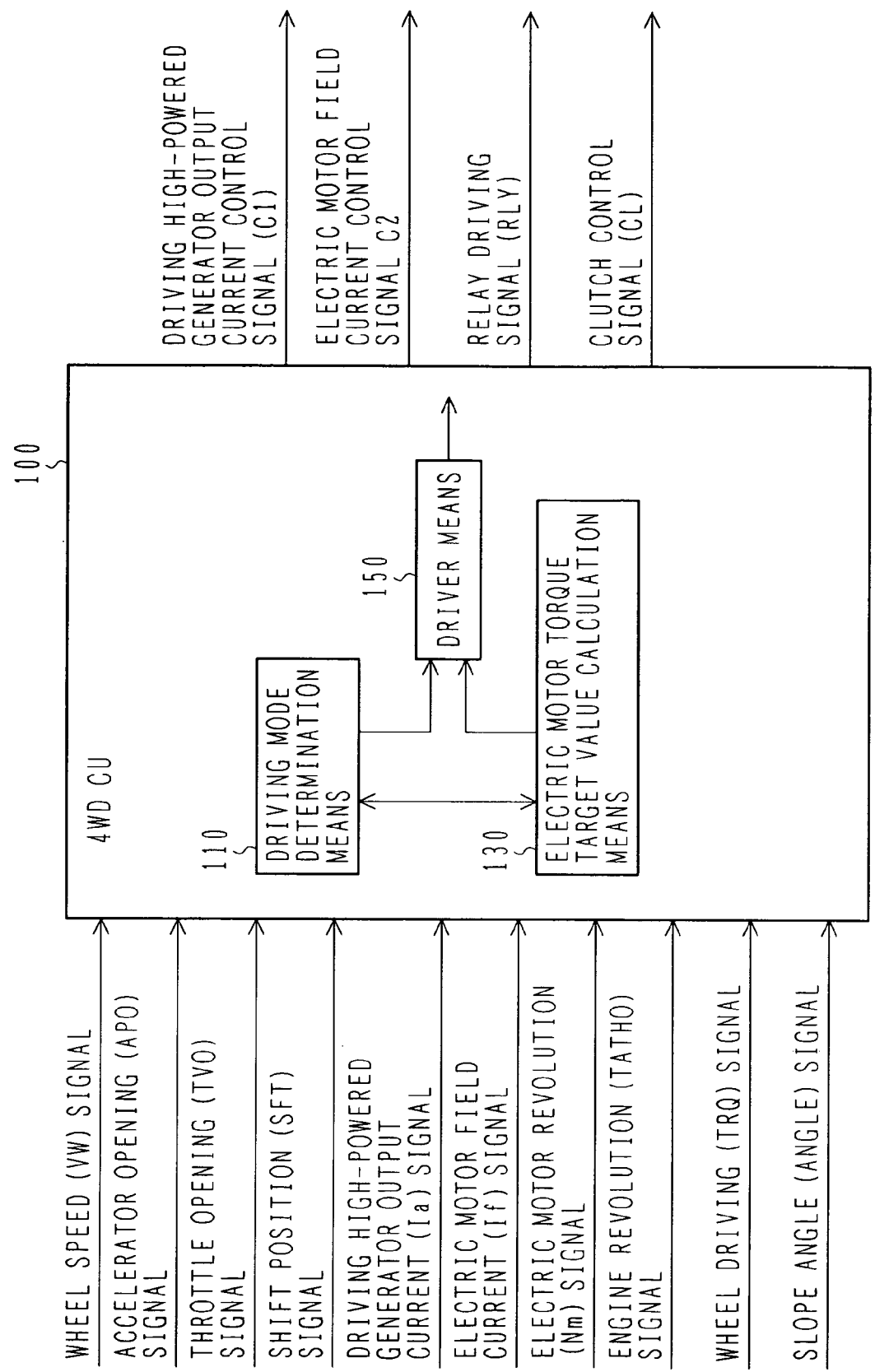
FIG. 2 is a system block diagram which shows a configuration of a vehicle driving force system according to an embodiment of the present invention.

Next, description will be made regarding a configuration of the vehicle driving force system according to the present embodiment with reference to FIG. 2. FIG. 2 is a system block diagram which shows a configuration of the vehicle driving force system according to an embodiment of the present invention.

The 4WDCU 100 includes driving mode determination means 110, electric motor torque target value calculation means 130, and driver means 150. Examples of the input signals input to the 4WDCU 100 include: a wheel speed (VW) signal; an accelerator opening (APO) signal; a throttle opening (TVO) signal; a shift position (SFT) signal; a driving high-powered generator output current (Ia) signal; an electric motor field current (If) signal; an electric motor revolution (Nm) signal; an engine revolution (TACHO) signal; a wheel driving force (TRQ) signal; and a slope angle (ANGLE) signal.

The wheel speed (VW) signal includes the left front wheel speed VWF_LH, right front wheel speed VWF_RH, left rear wheel speed VWR_LH, and right rear wheel speed VWR_RH, detected by the wheel speed sensors 16L and 16R, and 17L and 17R, respectively. Note that 4WDCU 100 calculates the rear wheel average speed VWR, which is the average of the left rear wheel speed VWR_LH and right rear wheel speed VWR_RH, and the front wheel average speed VWF, which is the average of the left front wheel speed VWF_LH and right front wheel speed VWF_RH.

The accelerator opening (APO) signal is an output signal of the aforementioned accelerator opening sensor. Upon the accelerator opening signal reaching a predetermined opening, e.g., an accelerator opening level of 3%, determination is made that the driver has pressed the accelerator pedal, and the 4WDCU 100 creates an accelerator ON signal. In a case that the accelerator opening signal is less than the aforementioned threshold, the 4WDCU 100 creates an accelerator OFF signal. Note that the 4WDCU 100 may have a threshold for accelerator ON determination, and a threshold for accelerator OFF determination, with an offset therebetween determined based upon the hysteresis of the accelerator opening signal.

The throttle opening (TVO) signal and the engine revolution (TACHO) signal are an output signal of the aforementioned throttle opening sensor and an output signal of the engine revolution sensor, respectively.

The shift position (SFT) signal is an output signal of the shift position sensor provided near a shift lever. With an arrangement included in an automatic transmission (AT) vehicle, the shift position signal indicates whether the shift position is set to the D range or the other ranges.

The driving high-powered generator output current (Ia) signal represents an output current of the driving high-powered generator (ALT2) 2, and is a current applied to the armature coil 5$b$ of the electric motor 5. The electric motor field current (If) signal represents a field current applied to the field coil of the electric motor 5. The electric motor revolution (Nm) signal is a signal indicating the revolution of the electric motor 5.

Furthermore, the 4WDCU 100 outputs: a driving high-powered generator output current control signal C1 for controlling the field current applied to the field coil of the driving high-powered generator (ALT2) 2; an electric motor field current control signal C2 for controlling the field current applied to the field coil of the electric motor 5; a RLY driving signal RLY for controlling opening/closing of the relay 7; and a clutch control signal CL for controlling engagement/disengagement of the clutch (CL) 4.

The driving mode determination means 110 determine the driving mode (MODE) of the four-wheel drive vehicle based upon the wheel speed (VW) signal, accelerator opening (APO) signal, and shift (SFT) signal. Examples of the driving modes (MODEs) thus determined include: a driving mode 2, i.e., 2WD mode; driving mode 3, i.e., 4WD standby mode; driving mode 4, i.e., creeping mode; driving mode 5, i.e., 4WD control mode; driving mode 6, i.e., rev-match mode; and driving mode 7, i.e., stop sequence mode.

Description will be made regarding the operation of the driving mode determination means 110 included in the vehicle driving force system according to the present embodiment with reference to FIG. 3.

Figure 3:
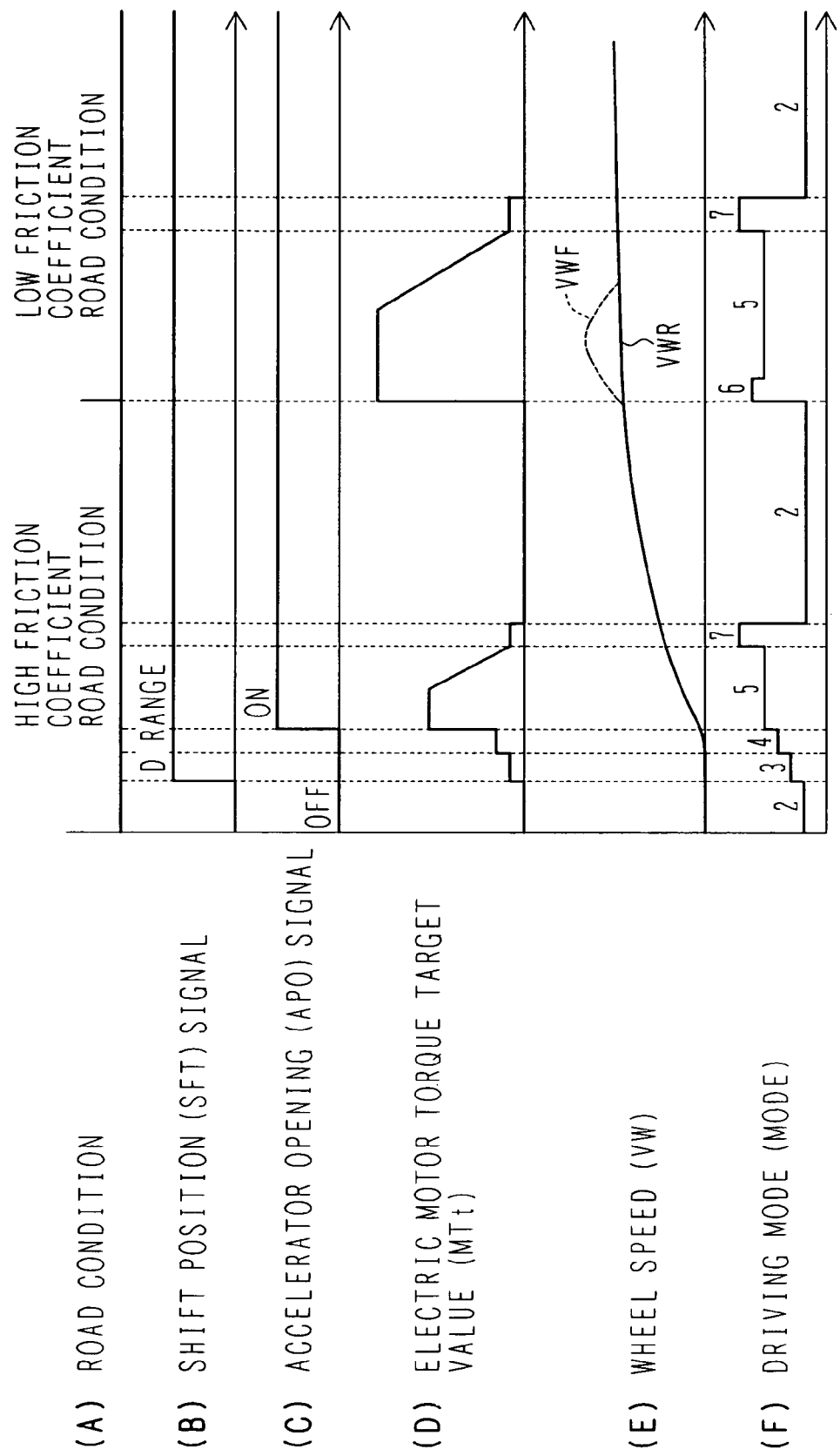
FIG. 3 is a timing chart which shows the operation of driving mode determination means included in a vehicle driving force system according to an embodiment of the present invention.

FIG. 3 is a timing chart which shows the operation of the driving mode determination means included in the vehicle driving force system according to an embodiment of the present invention.

In FIG. 3, the operation of the driving mode determination means 110 is classified based upon the road conditions as indicated by (A). Specifically, the operation is classified into the operation under a high friction coefficient (which will also be referred to as "high μ" hereafter) road condition and a low friction coefficient (which will also be referred to as "low μ" hereafter) road condition, for example. In FIG. 3, the region (B) shows the shift position (SFT) signal. With the present embodiment, determination is made whether the shift position is set to the D range or the other ranges based upon the output of the shift position sensor. In FIG. 3, the region (C) shows the accelerator opening (APO) signal. As described above, in a case that the accelerator opening has reached 3%, for example, the accelerator opening signal is set to ON. On the other hand, in a case of the accelerator opening less than this threshold, the accelerator opening signal is set to OFF. In FIG. 3, the region (D) shows the target electric motor torque (MTt) value. In FIG. 3, the region (E) shows the wheel speed (VW). The wheel speed (VW) signal includes the left front wheel speed VWF_LH, right front wheel speed VWF_RH, left rear wheel speed VWR_LH, and right rear wheel speed VWR_RH. The region (E) shows the front wheel average speed VWF, which is the average of the left front wheel speed VWF_LH and right front wheel speed VWF_RH, and the rear wheel average speed VWR, which is the average of the left rear wheel speed VWR_LH and right rear wheel speed VWR_RH. In FIG. 3, the region (F) shows the driving mode (MODE) determined by the driving mode determination means 110.

Let us say that the shift position (SFT) signal indicates the D range, the accelerator opening (APO) signal is set to OFF, and the wheel speed (VW) is 0 km/hour, as shown in the regions (B), (C), and (E) in FIG. 3. In this case, the driving mode determination means 110 make a determination of the driving mode 3, i.e., 4WD standby mode. Then, the driving mode determination means 110 output a target electric motor torque (MTt) value of 0.5 Nm, for example, to the driver means 150 shown in FIG. 2. As a result, the electric motor 5 outputs 0.5 Nm torque, for example, and such a slight torque thus output is transmitted to the rear wheels. This enables the standby mode to make an immediate response to the next four-wheel drive mode. The driver means 150 output the driving high-powered generator output current control signal C1 so as to instruct the electric motor 5 to output the torque matching the target electric motor torque (MTt) value of 0.5 Nm thus set, for example. Detailed description will be made later regarding the driver means 150 with reference to FIG. 8.

Next, let us say that the shift position (SFT) signal indicates the D range, the accelerator opening (APO) signal is set to OFF, and the wheel speed (VW) is slightly greater than 0 km/hour, which indicates that the vehicle is creeping, as shown in the regions (B), (C), and (E) in FIG. 3. In this case, the driving mode determination means 110 make a determination of the driving mode 4, i.e., the creeping mode. Then, the driving mode determination means 110 output a target electric motor torque (MTt) value of 1.0 Nm, for example, to the driver means 150 shown in FIG. 2. This value is greater than the target value output in the driving mode 3, i.e., the 4WD standby mode. Specifically, when the vehicle is creeping by the driving force transmitted to the front wheels (14L and 14R) from the engine (ENG) 1, the electric motor 5 also transmits the driving force to the rear wheels (15L and 15R), whereby the vehicle creeps by the driving forces of the front and rear wheels.

Next, let us say that the shift position (SFT) signal indicates the D range, and the accelerator opening (APO) signal is set to ON, as shown in the regions (B), and (C) in FIG. 3. In this case, the driving mode determination means 110 make a determination of the driving mode 5, i.e., the 4WD control mode. Then, the driving mode determination means 110 notifies the electric motor torque target value calculation means 130 shown in FIG. 2 that the current driving mode is the driving mode 5, i.e., the 4WD control mode. Then, the electric motor torque target value calculation means 130 set the target electric motor torque (MTt) value to 4.5 Nm, for example, as shown in the region (D) in FIG. 3. Subsequently, the electric motor torque target value calculation means 130 maintain the target electric motor torque (MTt) value of 4.5 Nm until the wheel speed (VW) reaches 8 km/hour, for example, as shown in the region (E) in FIG. 3. Upon the wheel speed (VW) reaching 8 km/hour, the target electric motor torque (MTt) value is linearly reduced to 0.5 Nm in a predetermined period of time. Upon the target electric motor torque (MTt) value dropping to 0.5 Nm as shown in the region (D) in FIG. 3, the driving mode determination means 110 make a determination of the driving mode 7, i.e., the stop sequence mode. In this case, the driving mode determination means 110 maintains the target electric motor torque (MTt) value of 0.5 Nm during a predetermined period of time, following which the driving mode determination means 110 turn off the relay (RLY) 7 and the clutch (CL) 4. Then, the target electric motor torque (MTt) value is set to 0 Nm.

As described above, with the present embodiment, at the starting time, the electric motor 5 drives the rear wheels (15L and 15R), while the engine (ENG) 1 drives the front wheels (14L and 14R). That is to say, at the starting time, the vehicle is driven in the four-wheel drive mode, thereby improving the starting performance under a low friction coefficient road condition. Note that the above-described sequence is employed for the operation under a high friction coefficient road condition as shown in the region (A) in FIG. 3.

Note that, in the event that a skid of the front wheels has occurred in the operation under a low friction coefficient road condition shown in the region (A) in FIG. 3, the driving mode determination means 110 make a determination of the driving mode 6, i.e., the rev-match mode, in order to effect recovery from the skid of the front wheels. Description thereof will be made later.

Description will be made regarding a configuration of the electric motor torque target value calculation means 130 included in the vehicle driving force system according to the present embodiment with reference to FIG. 4.

Figure 4:
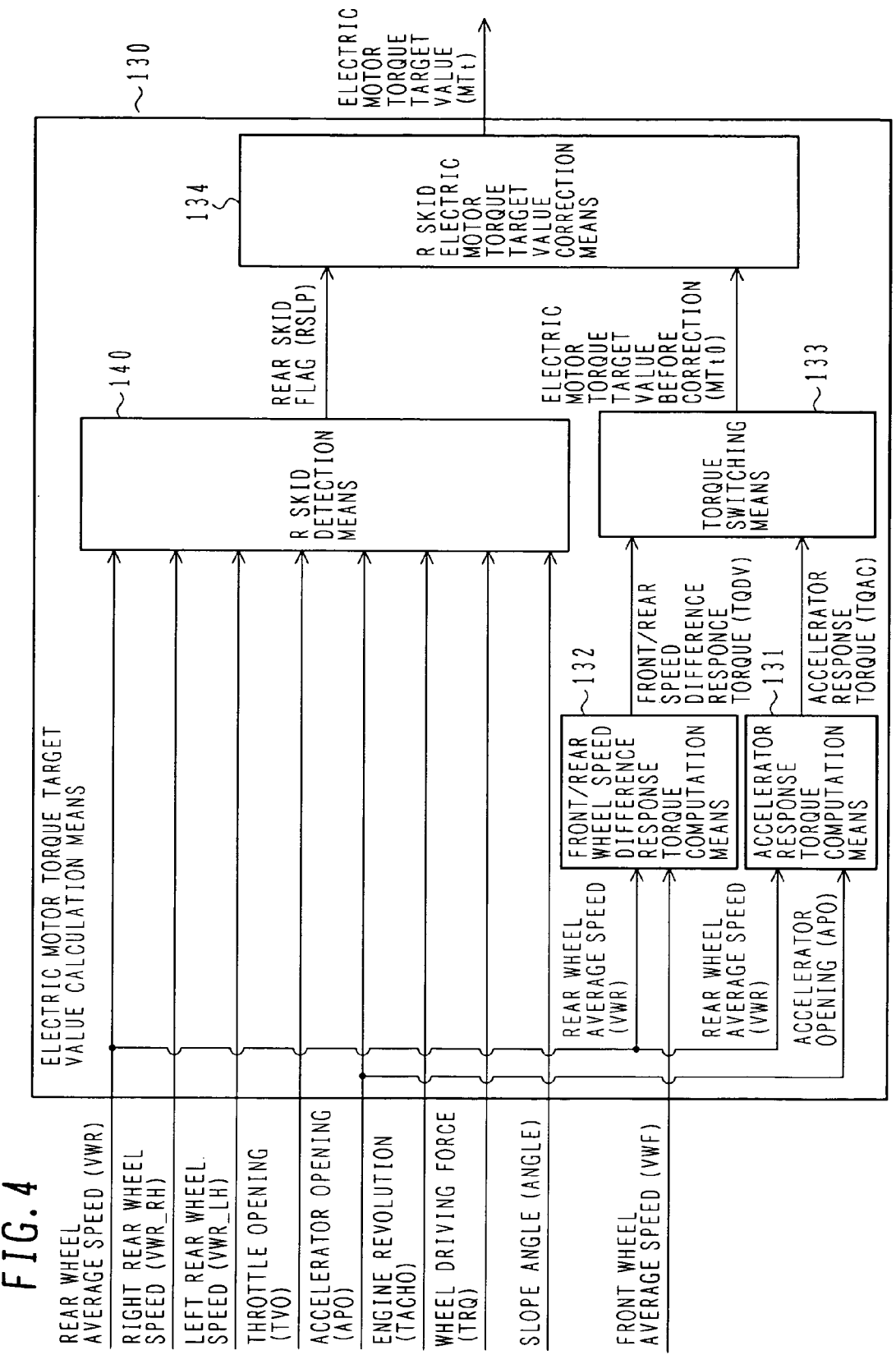
FIG. 4 is a block diagram which shows a configuration of electric motor torque target value calculation means included in a vehicle driving force system according to an embodiment of the present invention.

FIG. 4 is a block diagram which shows a configuration of the electric motor torque target value calculation means included in the vehicle driving force system according to an embodiment of the present invention.

The electric motor torque target value calculation means 130 include accelerator response torque computation means 131, front/rear wheel speed difference response torque computation means 132, torque switching means 133, R skid detection means 140, and R skid electric motor torque target value correction means 134.

In a case that the driving mode determination means 11 have made a determination of the driving mode 5, i.e., the 4WD control mode, the accelerator response torque computation means 131 calculate the electric motor torque target value. In a case that there is a difference between the front wheel speed and the rear wheel speed (in particular, in a case that the front wheel speed is greater than the rear wheel speed), and determination has been made that a skid of the front wheels has occurred, the front/rear wheel speed difference response torque computation means 132 calculate the electric motor torque target value. The torque switching means 133 make a comparison between the electric motor torque target value output from the accelerator response torque computation means 131 and that output from the front/rear wheel speed difference response torque computation means 132, and output the greater of the two. Let us consider a case in which the driving mode determination means 110 have made a determination of the driving mode 5, i.e., the 4WD control mode, and there is no difference between the front wheel speed and the rear wheel speed because the vehicle is being driven under a high friction coefficient road condition. In this case, the front/rear wheel speed difference response torque computation means 132 output an electric motor torque target value of 0 Nm, and accordingly, the torque switching means 133 output the same value as that output from the accelerator response torque computation means 131.

The R skid detection means 140 detect whether or not a skid of the rear wheels has occurred. In a case of detection of a skid of the rear wheels, the R skid electric motor torque target value correction means 134 correct the electric motor torque target value (MTt) output from the torque switching means 133 so as to effect recovery from the skid of the rear wheels. Let us consider a case in which the driving mode determination means 110 have made a determination of the driving mode 5, i.e., the 4WD control mode, and a skid of the rear wheels is not detected because the vehicle is being driven under a high friction coefficient road condition. In this case, the R skid electric motor torque target value correction means 134 do not make correction, and accordingly, the R skid electric motor torque target value correction means 134 output the same value as that output from the accelerator response torque computation means 131.

Now, description will be made regarding the target electric motor torque calculated by the accelerator response torque computation means 131 in a case that the driving mode determination means 110 have made a determination of the driving mode 5, i.e., the 4WD control mode, with reference to FIGS. 4 and 5.

Figure 5:
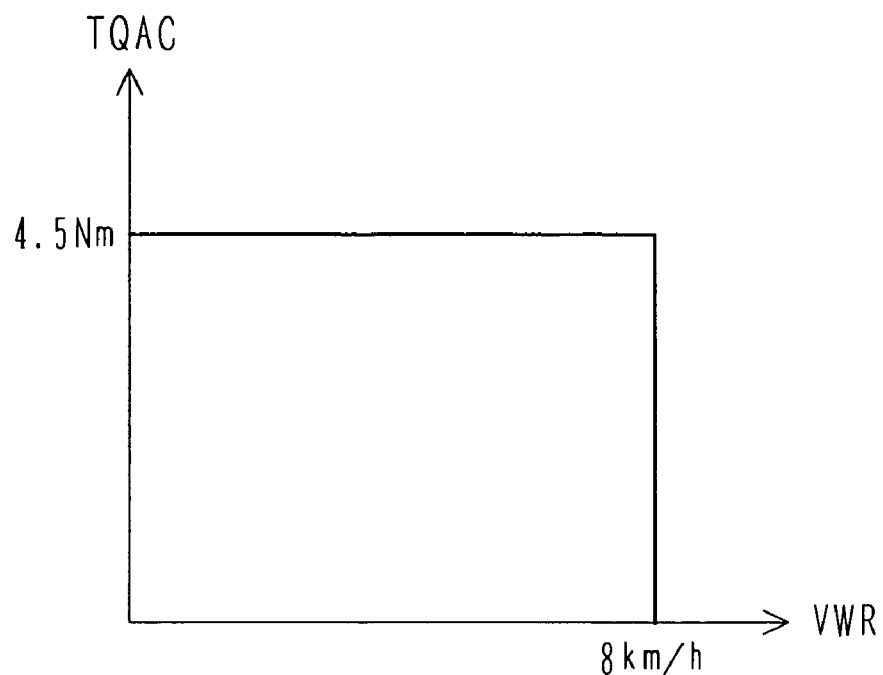
FIG. 5 is an operating characteristic chart which shows the operation of accelerator response torque computation means included in electric motor torque target value calculation means of a vehicle driving force system according to an embodiment of the present invention.

FIG. 5 is an operating characteristic chart which shows the operation of the accelerator response torque computation means included in the electric motor torque target value calculation means of the vehicle driving force system according to an embodiment of the present invention.

The accelerator response torque computation means 131 receive the rear wheel average speed VWR and the accelerator opening APO as input signals, as shown in FIG. 4. Here, the rear wheel average speed VWR is the average of the left rear wheel speed VWR_LH and the right rear wheel speed VWR_RH.

Upon detection of an ON accelerator opening signal APO, the accelerator response torque computation means 131 output the accelerator response torque signal TQAC corresponding to the rear wheel average speed VWR. That is to say, upon detection of an ON accelerator opening signal APO, in a case of a rear wheel average speed VWR less than 8 km/hour, the accelerator response torque computation means 131 output an accelerator response torque signal TQAC of 4.5 Nm. On the other hand, in a case of a rear wheel average speed VWR of 8 km/hour or more, the accelerator response torque computation means 131 output an accelerator response torque signal TQAC of 0 Nm.

As a result, the electric motor torque target value calculation means 130 set the electric motor torque target value (MTt) to 4.5 Nm, for example, as shown in the region (D) in FIG. 3, for example. Then, the electric motor torque target value calculation means 130 maintain the electric motor torque target value (MTt) of 4.5 Nm until the vehicle speed VW reaches 8 km/hour as shown in the region (E) in FIG. 3. Upon the vehicle speed VW reaching 8 km/hour, the accelerator response torque computation means 131 linearly reduce the electric motor torque target value (MTt) to 0.5 Nm in a predetermined period of time.

Next, returning to FIG. 3, description will be made regarding the operation in a case that a skid of the wheels has occurred while the vehicle is being driven under a low friction coefficient road condition as shown in the region (A) in FIG. 3. In this case, the driving mode determination means 110 make a determination of the driving mode 6, i.e., the rev-match mode, in order to effect recovery from the skid of the wheels. That is to say, in a case that there is a difference between the front wheel average speed VWF and the rear wheel average speed VWR (in particular, in a case that the front wheel average speed VWF is greater than the rear wheel average speed VWR), and determination has been made that a skid of the front wheels has occurred, the driving mode determination means 110 make a determination of the driving mode 6, i.e., the rev-match mode as shown in the region (E) in FIG. 3. Upon the wheel shaft revolution matching the electric motor revolution, the driving mode determination means 110 switch the driving mode from the rev-match mode to the driving mode 5, i.e., the 4WD control mode.

The front/rear wheel speed difference response torque computation means 132 shown in FIG. 4 calculate the target electric motor torque so as to effect recovery from the skid of the front wheels based upon the difference between the front wheel average speed VWF and the rear wheel average speed VWR.

Now, description will be made regarding the target electric motor torque calculated by the front/rear wheel speed difference response torque computation means 132 in a case that the driving mode determination means 110 have made a determination of the driving mode 5, i.e., the 4WD control mode, with reference to FIGS. 4 and 6.

Figure 6:
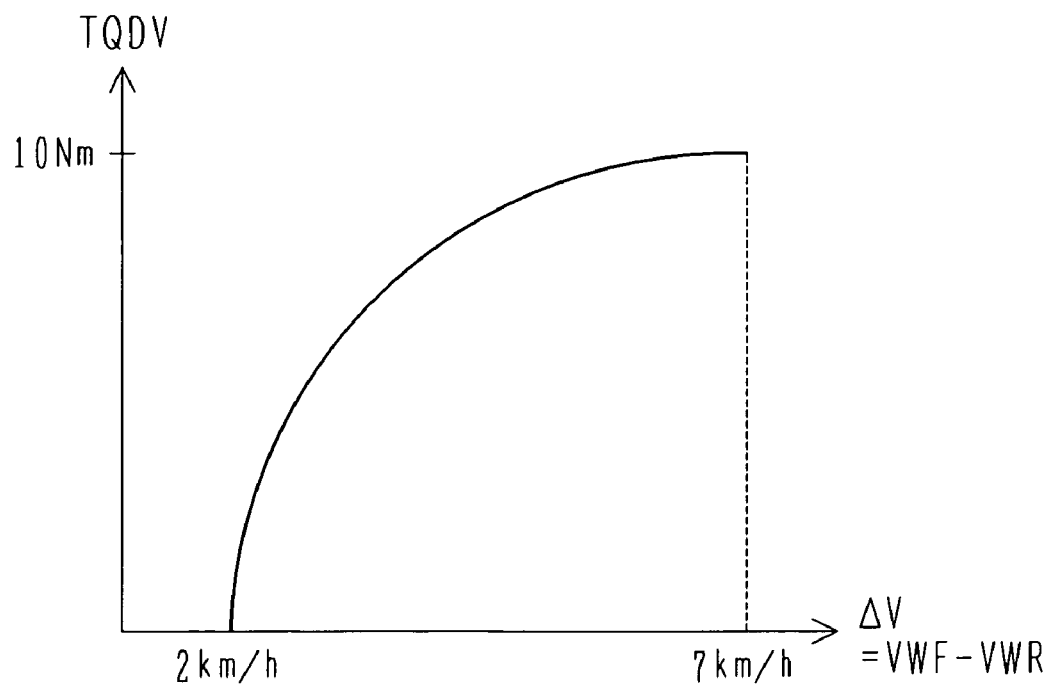
FIG. 6 is an operating characteristic chart which shows the operation of the front/rear wheel speed difference response torque computation means included in electric motor torque calculation means of a vehicle driving force system according to an embodiment of the present invention.

FIG. 6 is an operating characteristic chart which shows the operation of the front/rear wheel speed difference response torque computation means included in the electric motor torque target value calculation means of the vehicle driving force system according to an embodiment of the present invention.

As shown in FIG. 4, the front/rear wheel speed difference response torque computation means 132 receive the rear wheel average speed VWR and the front wheel average speed VWF as input signals. Here, the front wheel average speed VWF is the average of the left front wheel speed VWF_LH and right front wheel speed VWF_RH.

The front/rear wheel speed difference response torque computation means 132 output the front/rear wheel speed difference response torque signal TQDV which increases corresponding to an increase in the front/rear wheel speed difference $\Delta V$ (=VWF−VWR), which is the difference between the front wheel average speed VWF and the rear wheel average speed VWR. For example, as shown in FIG. 6, the front/rear wheel speed difference response torque computation means 132 output the front/rear wheel speed difference response torque signal TQDV of 0 Nm to 10 Nm. The front/rear wheel speed difference response torque signal TQDV is gradually increased corresponding to an increase of the front/rear wheel speed difference $\Delta V$ of 2 km/hour to 7 km/hour.

The torque switching means 133 make a comparison between the output TQAC from the accelerator response torque computation means 131 and the output TQDV from the front/rear wheel speed difference response torque computation means 132, and output the greater of the two to the driver means 150.

Specifically, in a case that a skid of the front wheels has occurred while the vehicle is being driven under a low friction coefficient road condition as shown in the region (A) in FIG. 3, the driving mode determination means 110 make a determination of the driving mode 6, i.e., the rev-match mode. The rev-match mode is maintained until the wheel shaft revolution matches the electric motor revolution. Subsequently, the driving mode is switched to the driving mode 5, i.e., the 4WD control mode. As a result, the electric motor torque target value calculation means 130 set the electric motor torque target value (MTt) to 10 Nm as shown in the region (D) in FIG. 3, for example, as described above with reference to FIG. 3. With such an arrangement, in a case that the vehicle speed is 8 km/hour or less, for example, the accelerator response torque computation means 131 output the output TQAC of 4.5 Nm, as shown in FIG. 5. On the other hand, let us consider a case in which the front/rear wheel speed difference ΔV (=VWF−VWR), which is the difference between the front wheel average speed VWF and the rear wheel average speed VWR, is 3 km/hour, and the front/rear wheel speed difference response torque computation means 132 output the output TQDV of 5.5 Nm. In this case, the torque switching means 133 output an output signal of 5.5 Nm. Furthermore, upon the front/rear wheel speed difference ΔV (=VWF−VWR), which is the difference between the front wheel average speed VWF and the rear wheel average speed VWR, dropping to 2 km/hour or less, the electric motor torque target value (MTt) is linearly reduced to 0.5 Nm in a predetermined period of time. Upon the electric motor torque target value (MTt) dropping to 0.5 Nm, the driving mode is switched to the driving mode 7, i.e., the stop sequence mode where the 4WDCU 100 turns off the relay (RLY) 7 in a predetermined period of time, as well as disengaging the clutch (CL) 4.

Now, description will be made regarding the driver means 150 included in the vehicle driving force system according to the present invention with reference to FIG. 7.

Figure 7:
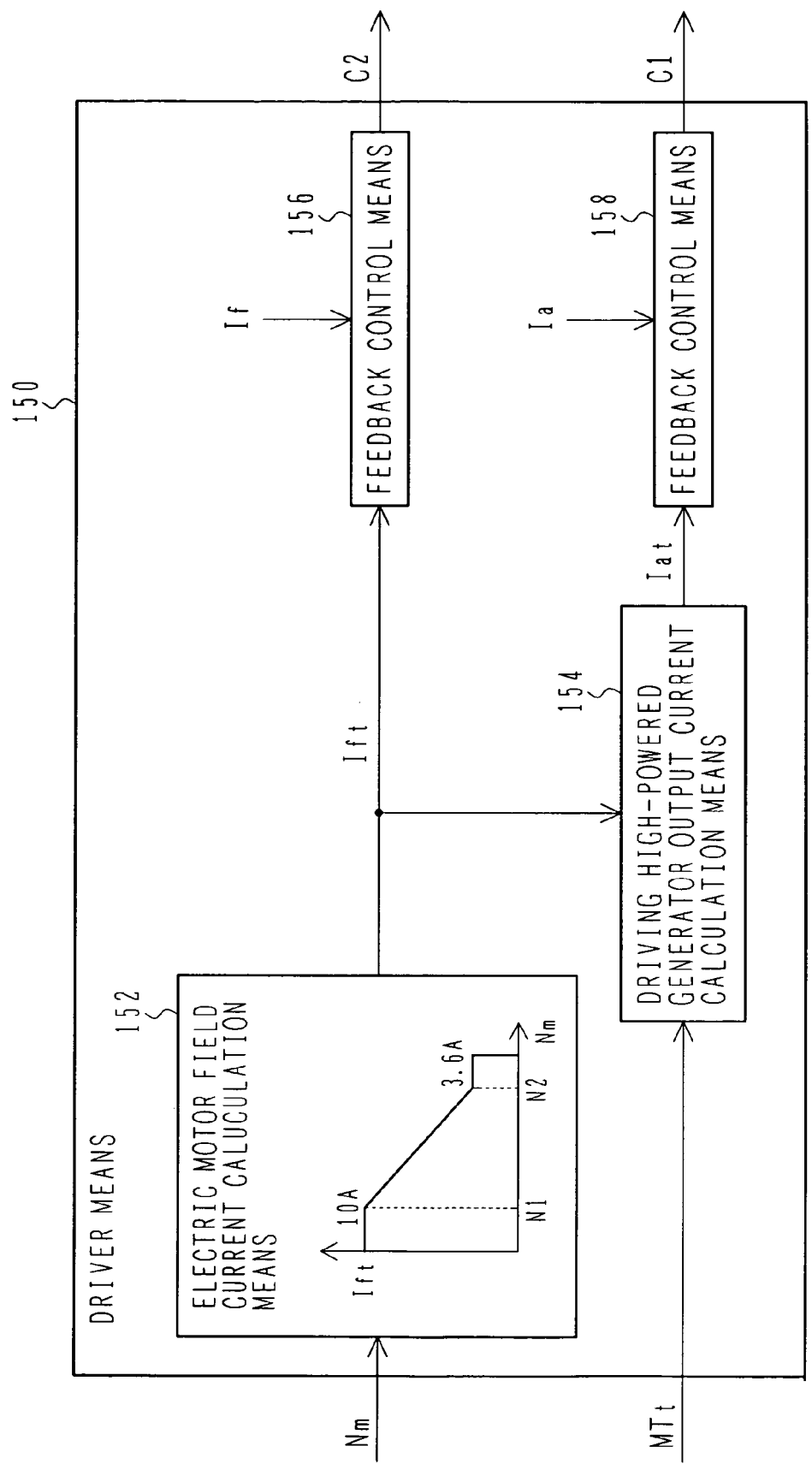
FIG. 7 is a block diagram which shows a configuration of driver means included in a vehicle driving force system according to an embodiment of the present invention.

FIG. 7 is a block diagram which shows a configuration of the driver means included in the vehicle driving force system according to an embodiment of the present invention.

The driver means 150 include electric motor field current calculation means 152, driving high-powered generator output current calculation means 154, and feedback control means 156 and 158. The electric motor field current calculation means 152 calculate the current to be applied to the field coil 5a of the electric motor 5 based upon the electric motor revolution signal Nm input to the 4WDCU 100 shown in FIG. 2. For example, in a case of an electric motor revolution Nm of N1 or less, the electric motor field current calculation means 152 set the target electric motor field current Ift to 10 A as shown in FIG. 7. On the other hand, in a case of an electric motor revolution Nm of N1 to N2, the electric motor field current calculation means 152 gradually reduce the target electric motor field current Ift from 10 A to 3.6 A. In a case of the electric motor revolution Nm of N2 or more, the electric motor field current calculation means 152 set the target electric motor field current Ift to 3.6 A. As described above, the field current is reduced corresponding to an increase in the revolution of the electric motor 5. This enables the electric motor 5 to be driven at a high revolution. The feedback control means 156 detect the difference between the target electric motor field current Ift and the actually-detected field current If of the electric motor 5, and adjust the current C2 applied to the field coil of the electric motor 5 (specifically, the feedback control means 156 adjust the duty ratio of a duty signal used for the switching operation of the electric power converter) such that the difference matches zero, thereby enabling feedback control.

The driving high-powered generator output current calculation means 154 calculate the current to be applied to the armature coil 5b of the electric motor 5 based upon the target electric motor torque MTt output from the electric motor torque target value calculation means 130 and the target electric motor field current Ift output from the electric motor field current calculation means 152, using a map. The feedback control means 158 detect the difference between the target generator output current Iat and the actually-detected electric-motor armature-coil current Ia, and adjust the current C1 applied to the field coil of driving high-powered generator (ALT2) 2 (specifically, the feedback control means 158 adjust the duty ratio of a duty signal used for the switching operation of the electric power converter) such that the difference matches zero, thereby enabling feedback control.

Next, description will be made regarding a detection method for a skid of the rear wheels and a correction method for the electric motor torque, which are employed in the vehicle driving force system according to the present embodiment, with reference to FIGS. 8 and 9.

First, description will be made regarding a configuration of the R skid detection means 140 included in the electric motor torque target value calculation means of the vehicle driving force system according to the present embodiment, with reference to FIG. 8.

FIG. 8 is a block diagram which shows a configuration of the R skid detection means included in the electric motor torque target value calculation means of the vehicle driving force system according to an embodiment of the present invention.

The R skid detection means 140 include differentiators 141, 142, and 143, skid detection acceleration threshold calculation means 144, and an acceleration skid detector 145.

The differentiator 141 calculates the derivative value of the rear wheel average speed VWR, i.e., the rear-wheel acceleration GWR. The differentiator 142 calculates the right rear wheel acceleration GWRR. The differentiator 143 calculates the left rear wheel acceleration GWRL.

The skid detection acceleration threshold calculation means 144 calculate the acceleration of the vehicle which can occur, based upon the wheel speed (VW), throttle opening (TVO), accelerator opening (APO), engine revolution (TACHO), wheel driving force (TRQ), and slope angle (ANGLE), and outputs the acceleration thus calculated, as a skid detection acceleration threshold (GMARG). The acceleration skid detector 145 makes a comparison between each of the wheel accelerations (GWR, GWRR, GWRL) output from the differentiators 141, 142, and 143, and the skid detection acceleration threshold (GMARG) output from the skid detection acceleration threshold calculation means 144. In a case that each of the wheel accelerations is greater than the skid detection acceleration threshold (GMARG), determination is made that a skid of the wheels has occurred, and the acceleration skid detector 145 sets the rear skid flag RSLP to 1. At the time of recovery from the skid of the wheels, the wheel speed is reduced, and accordingly, each of the wheel accelerations exhibits a negative value. In this case, determination is made that the vehicle has recovered from the skid of the wheels, and the acceleration skid detector 145 sets the rear skid flag RSLP to 0.

Note that the acceleration skid detector 145 determines whether or not the vehicle speed is being reduced, based upon the accelerator opening (APO), throttle opening (TVO), wheel driving force (TRQ), and wheel speed (VW). In a case that the vehicle speed is being reduced, the acceleration skid detector 145 stops skid detection based upon the acceleration, and sets the rear skid flag RSLP to 0.

Next, description will be made regarding the operation of the skid detection acceleration threshold calculation means included in the electric motor torque target value calculation means of the vehicle driving force system according to the present embodiment with reference to FIG. 9.

FIG. 9 is a block diagram which shows a configuration of the skid detection acceleration threshold calculation means included in the electric motor torque target value calculation means of the vehicle driving force system according to an embodiment of the present invention.

The skid detection acceleration threshold calculation means 144 include throttle opening skid detection threshold calculation means 144A, accelerator opening skid detection threshold calculation means 144B, a differentiator 144C, accelerator opening speed skid detection coefficient calculation means 144D, engine revolution skid detection threshold calculation means 144E, wheel driving force skid detection threshold calculation means 144F, wheel speed skid detection threshold calculation means 144G, slope angle skid detection coefficient calculation means 144H, and acceleration threshold selection means 144I.

Next, description will be made regarding the skid detection acceleration threshold calculation means included in the R skid detection means of the vehicle driving force system according to the present embodiment, with reference to FIGS. 9 through 16.

Figure 10A:
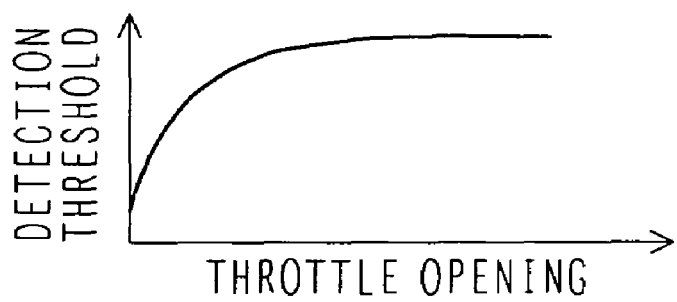
FIGS. 10A-10C are operating characteristic charts which show the operation of throttle opening skid detection threshold calculation means included in electric motor torque target value calculation means of a vehicle driving force system according to an embodiment of the present invention.
Figure 10B:
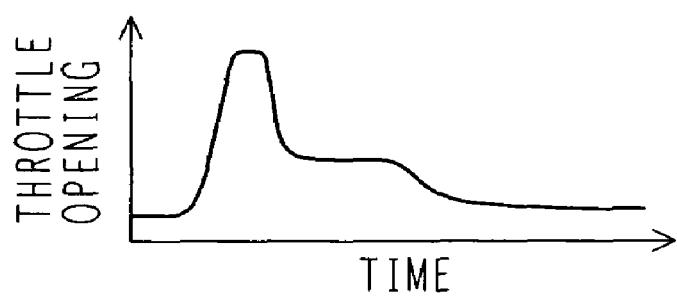
Figure 10C:
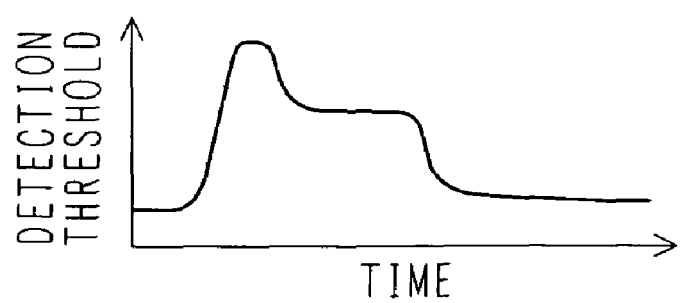
Figure 11A:
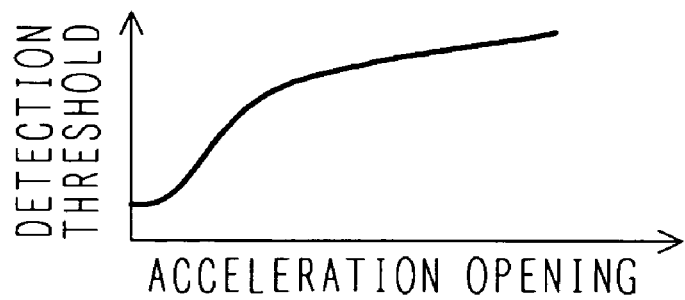
FIGS. 11A-11C are operating characteristic charts which show the operation of accelerator opening skid detection threshold calculation means included in electric motor torque target value calculation means of a vehicle driving force system according to an embodiment of the present invention.
Figure 11B:
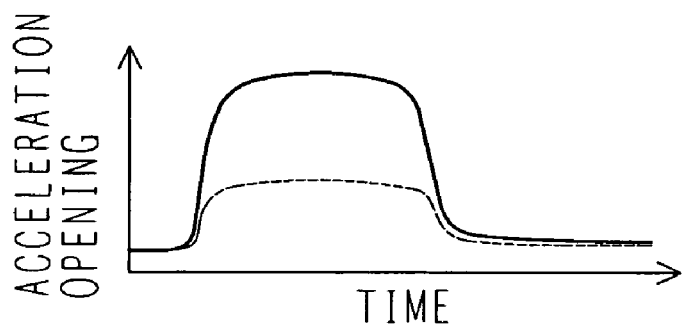
Figure 11C:
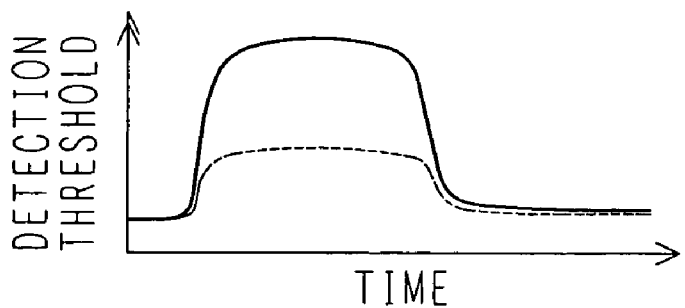
Figure 12A:
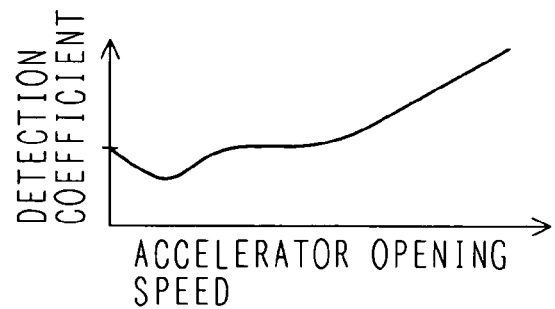
FIGS. 12A-12D are operating characteristic charts which show the operation of accelerator opening speed skid detection coefficient calculation means included in electric motor torque target value calculation means of a vehicle driving force system according to an embodiment of the present invention.
Figure 12B:
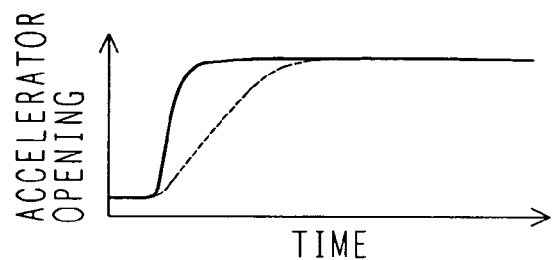
Figure 12C:
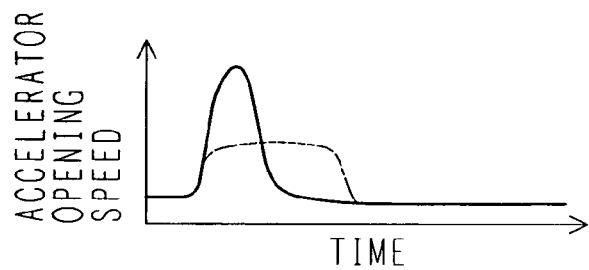
Figure 12D:
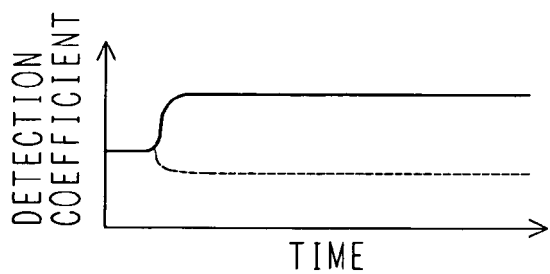
Figure 13A:
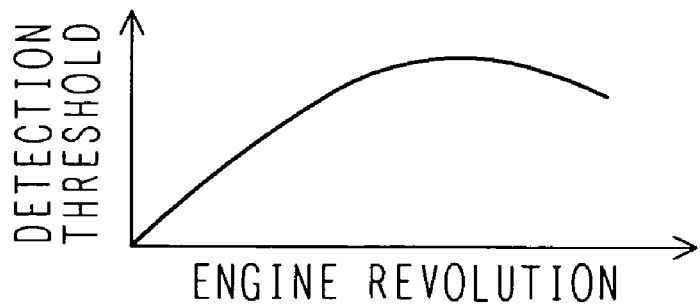
FIGS. 13A-13C are operating characteristic charts which show the operation of engine revolution skid detection threshold calculation means included in electric motor torque target value calculation means of a vehicle driving force system according to an embodiment of the present invention.
Figure 13B:
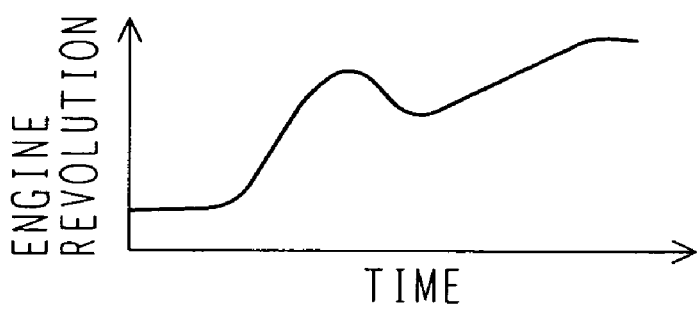
Figure 13C:
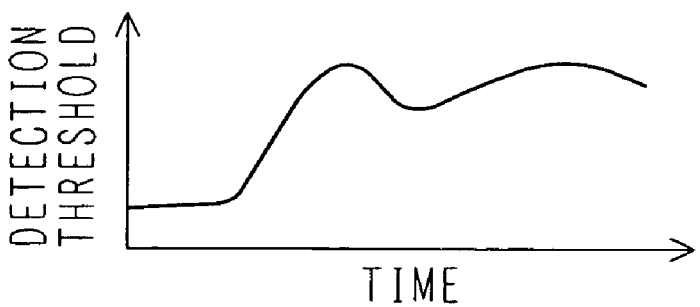
Figure 14:
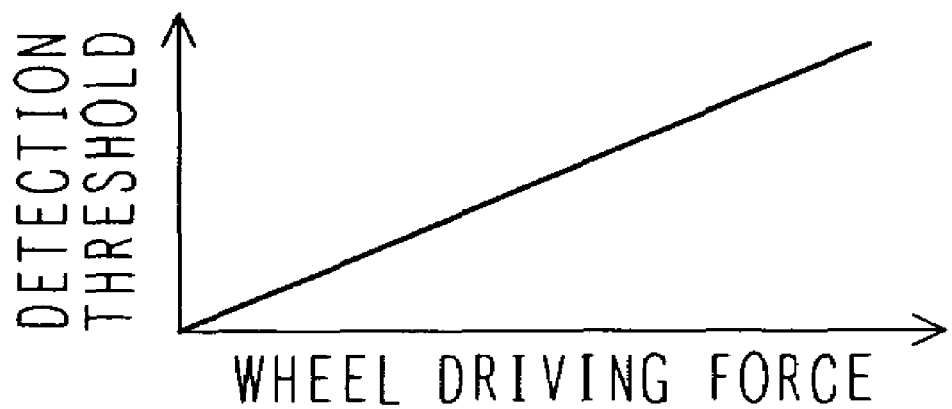
FIG. 14 is an operating characteristic chart which shows the operation of wheel driving force skid detection threshold calculation means included in electric motor torque target value calculation means of a vehicle driving force system according to an embodiment of the present invention.
Figure 15:
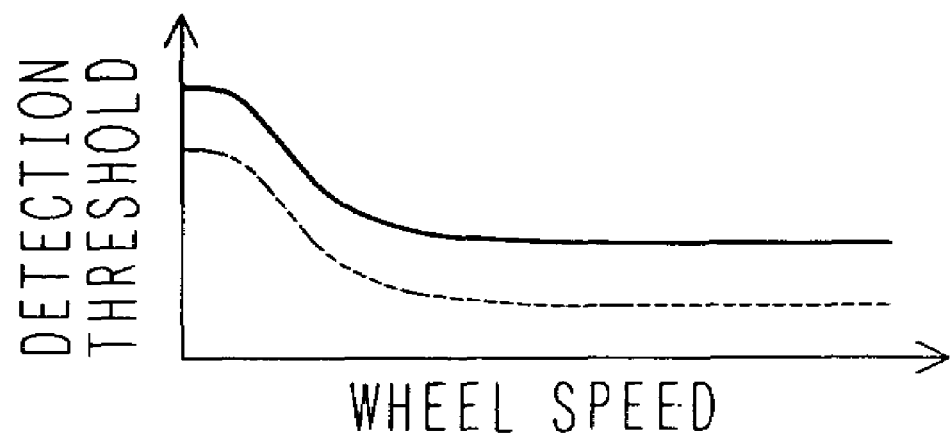
FIG. 15 is an operating characteristic chart which shows the operation of wheel speed skid detection threshold calculation means included in electric motor torque target value calculation means of a vehicle driving force system according to an embodiment of the present invention.
Figure 16:
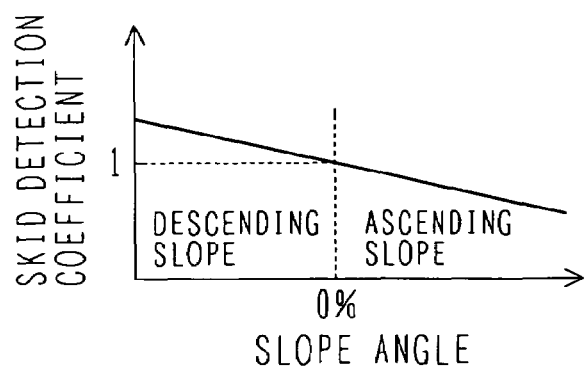
FIG. 16 is an operating characteristic chart which shows the operation of slope angle skid detection coefficient calculation means included in electric motor torque target value calculation means of a vehicle driving force system according to an embodiment of the present invention.

FIGS. 10A-10C are operating characteristic charts which show the operation of the throttle opening skid detection threshold calculation means included in the electric motor torque target value calculation means of the vehicle driving force system according to an embodiment of the present invention. FIGS. 11A-11C are operating characteristic charts which show the operation of the accelerator opening skid detection threshold calculation means included in the electric motor torque target value calculation means of the vehicle driving force system according to an embodiment of the present invention. FIGS. 12A-12d are operating characteristic charts which show the operation of the accelerator opening speed skid detection coefficient calculation means included in the electric motor torque target value calculation means of the vehicle driving force system according to an embodiment of the present invention. FIGS. 13A-13C are operating characteristic charts which show the operation of the engine revolution skid detection threshold calculation means included in the electric motor torque target value calculation means of the vehicle driving force system according to an embodiment of the present invention. FIG. 14 is an operating characteristic chart which shows the operation of the wheel driving force skid detection threshold calculation means included in the electric motor torque target value calculation means of the vehicle driving force system according to an embodiment of the present invention. FIG. 15 is an operating characteristic chart which shows the operation of the wheel speed skid detection threshold calculation means included in the electric motor torque target value calculation means of the vehicle driving force system according to an embodiment of the present invention. FIG. 16 is an operating characteristic chart which shows the operation of the slope angle skid detection coefficient calculation means included in the electric motor torque target value calculation means of the vehicle driving force system according to an embodiment of the present invention.

As shown in FIG. 9, the throttle opening skid detection threshold calculation means 144A receive a throttle opening (TVO) signal as an input signal. The throttle opening skid detection threshold calculation means 144A calculate a throttle opening skid detection threshold (TVGMARG) corresponding to the throttle opening (TVO) with reference to a table as shown in FIG. 10A, and output the throttle opening skid detection threshold (TVGMARG) thus calculated. FIG. 10C shows the throttle opening skid detection threshold (TVGMARG) calculated based upon the throttle opening signal shown in FIG. 10B and using a table shown in FIG. 10A. In general, the greater the throttle opening is, the greater the driving force output from the engine is. Accordingly, the throttle opening skid detection threshold shown in FIG. 10C is set to an increased value corresponding to an increase in the throttle opening shown in FIG. 10B. Note that the engine output corresponds to the throttle opening with a certain time lag. Accordingly, the throttle opening skid detection threshold calculation means 144A may receive the throttle opening signal with a predetermined delay. Also, the throttle opening skid detection threshold calculation means 144A may output the throttle opening skid detection threshold with a predetermined delay.

As shown in FIG. 9, the accelerator opening skid detection threshold calculation means 144B receives the accelerator opening signal (APO) as an input signal. The accelerator opening skid detection threshold calculation means 144B calculate the accelerator opening skid detection threshold (APGMARG) corresponding to the accelerator opening (APO) with reference to a table shown in FIG. 11A, and output the accelerator opening skid detection threshold thus calculated. In FIG. 11B, the solid line represents the accelerator opening in a case of a great operation amount of the accelerator pedal as pressed by the driver. On the other hand, the broken line represents the accelerator opening in a case of a small operation amount of the accelerator pedal as pressed by the driver. FIG. 11C shows the accelerator opening skid detection threshold (APGMARG) calculated based upon the accelerator opening signal shown in FIG. 11B with reference to the table shown in FIG. 11A. As can be understood from FIG. 11C, the threshold (represented by the solid line) calculated in a case of a great operation amount of the accelerator pedal as pressed by the driver is greater than the threshold (represented by the broken line) calculated in a case of a small operation amount of the accelerator pedal as pressed by the driver. The reason is that the great operation amount of the accelerator pedal as pressed by the driver means that the driver requests great driving force to be applied to the vehicle, i.e., a great acceleration of the vehicle.

The differentiator 144C calculates the derivative value of the accelerator opening (APO), i.e., the speed of the accelerator opening. Specifically, the differentiator 144C outputs the accelerator opening speed signal (DAPO) shown in FIG. 12C based upon the accelerator opening signal, which is an input signal, shown in FIG. 12B. Here, in FIGS. 12B and 12C, the solid lines represent the accelerator opening signal and the accelerator opening speed signal in a case of a rapid operation amount of the accelerator pedal as pressed by the driver. On the other hand, in these drawings, the broken lines represent the accelerator opening signal and the accelerator opening speed signal in a case of a slow operation amount of the accelerator pedal as pressed by the driver. As can be understood from the accelerator opening speed represented by the solid line shown in FIG. 12C, the more rapid the operation amount of the accelerator pedal as pressed by the driver is, the greater the accelerator opening speed signal (DAPO) is.

As shown in FIG. 9, the accelerator opening speed skid detection coefficient calculation means 144D receive the accelerator opening speed signal (DAPO) output from the differentiator 144C, as an input signal. The accelerator opening speed skid detection coefficient calculation means 144D calculate the accelerator opening speed skid detection coefficient (DAGMARK) corresponding to the accelerator opening speed signal (DAPO) with reference to a table as shown in FIG. 12A, and output the accelerator opening speed skid detection coefficient (DAGMARK) thus calculated. In general, in a case of starting the vehicle under a low friction coefficient road condition, the driver presses the accelerator pedal slowly so as to prevent the skid of the wheels. This results in a small amount of the accelerator opening speed signal (DAPO) being output as indicated by the broken line shown in FIG. 12D. In this case, the accelerator opening speed skid detection coefficient calculation means 144D calculate the accelerator opening speed skid detection coefficient (DAGMARK) smaller than 1, with reference to the table as shown in FIG. 12A. On the other hand, in a case of a large amount of the accelerator opening speed signal (DAPO, represented by the solid line shown in FIG. 12C) being output, the accelerator opening speed skid detection coefficient calculation means 144D calculate the accelerator opening speed skid detection coefficient (DAGMARK) greater than 1, with reference to the table as shown in FIG. 12A. In other words, the table as shown in FIG. 12A is created such that the accelerator opening speed skid detection coefficient calculation means 144D obtain its calculation results based thereupon. Note that the accelerator opening speed skid detection coefficient calculated with reference to the table as shown in FIG. 12A is maintained until the accelerator opening signal drops from the peak value thereof to a predetermined value (e.g., 3%).

As shown in FIG. 9, the engine revolution skid detection threshold calculation means 144E receive the engine revolution (TACHO) as an input signal. The engine revolution skid detection threshold calculation means 144E calculate the engine revolution skid detection threshold (TAGMARG) corresponding to the engine revolution (TACHO) with reference to a table as shown in FIG. 13A, and output the engine revolution skid detection threshold (TAGMARG) thus calculated. FIG. 13C represents the engine revolution skid detection threshold (TAGMARG) calculated based upon the engine revolution (TACHO) shown in FIG. 13B with reference to the table shown in FIG. 13A. In general, the driving force output from the engine varies depending upon the throttle opening, even if the same engine revolution is maintained. Accordingly, the engine revolution skid detection threshold calculation means 144E may output the engine revolution skid detection threshold based upon the engine revolution and the throttle opening, which are input signals, with reference to a two-dimensional map.

As shown in FIG. 9, the wheel driving force skid detection threshold calculation means 144F receive the wheel driving force signal (TRQ) as an input signal. The wheel driving force skid detection threshold calculation means 144F calculate the wheel driving force skid detection threshold (TQGMARG) corresponding to the wheel driving force (TRQ) with reference to a table as shown in FIG. 14, and output the wheel driving force skid detection threshold (TQGMARG) thus calculated.

The wheel driving force (TRQ) is the sum of the driving force of the engine (ENG) 1 transmitted to the front wheels 14R and 14L through the transmission (T/M) 12, and the driving force of the electric motor 5 transmitted to the rear wheels 15R and 15L through the differential gear 3. The data of the driving force of the engine (ENG) 1 transmitted to the front wheels 14R and 14L is received from other control devices through the in-vehicle LAN (CAN). Also, the driving force of the engine (ENG) 1 transmitted to the rear wheels 15R and 15L may be calculated based upon the driving force of the engine (ENG) 1, the gear position and the gear ratio of the transmission (T/M) 12, and the final reduction ratio, for example. On the other hand, the data of the driving force of the engine is received from other control devices through the in-vehicle LAN (CAN). Also, the driving force of the engine (ENG) 1 may be calculated based upon the engine revolution (TACHO) signal, throttle opening (TVO) signal, and the load driving force of an auxiliary machine.

As shown in FIG. 9, the wheel speed skid detection threshold calculation means 144G receive the wheel speed (VW) as an input signal. The wheel speed skid detection threshold calculation means 144G calculate the wheel speed skid detection threshold (VWGMARG) corresponding to the wheel speed (VW) with reference to a table as indicated by the solid line in FIG. 15, and output the wheel speed skid detection threshold (VWGMARG) thus calculated. In a case that there is a difference between the front wheel average speed (VWF) and the rear wheel average speed (VWR) due to the skid of the front wheels, the wheel speed skid detection threshold calculation means 144G may calculate and output the wheel speed skid detection threshold (VWGMARG) with reference to a table as indicated by the broken line in FIG. 15, which is smaller than the wheel speed skid detection threshold indicated by the solid line.

As shown in FIG. 9, the slope angle skid detection coefficient calculation means 144H receive the slope angle (ANGLE) as an input signal. The slope angle skid detection coefficient calculation means 144H calculate the slope angle skid detection coefficient (AGGMARK) corresponding to the slope angle (ANGLE) with reference to a table as shown in FIG. 16, and output the slope angle skid detection coefficient (AGGMARK) thus calculated. As shown in FIG. 16, in a case of the slope angle (ANGLE) of 0%, i.e., in a case that the vehicle is being driven on a level slope, the slope angle skid detection coefficient (AGGMARK) is set to 1. In a case of the slope angle (ANGLE) greater than 0%, i.e., in a case that the vehicle is being driven on an ascending slope, the slope angle skid detection coefficient (AGGMARK) is set to a value smaller than 1. On the other hand, in a case of the slope angle (ANGLE) smaller than 0%, i.e., in a case that the vehicle is being driven on a descending slope, the slope angle skid detection coefficient (AGGMARK) is set to a value greater than 1.

The slope angle (ANGLE) signal, which is input to the slope angle skid detection coefficient calculation means 144H, is detected based upon the change in the weight of the vehicle. Also, the slope angle (ANGLE) signal may be detected using a tilt sensor.

As shown in FIG. 9, the acceleration threshold selection means 144I receive the throttle opening skid detection threshold (TVGMARG), the accelerator opening skid detection threshold (APGMARG), the accelerator opening speed skid detection coefficient (DAGMARK), the engine revolution skid detection threshold (TAGMARG), the wheel driving force skid detection threshold (TQGMARG), the wheel speed skid detection threshold (VWGMARG), and the slope angle skid detection coefficient (AGGMARK), as input signals. The acceleration threshold selection means 144I calculate the product of the smallest value among the skid detection thresholds thus input, the accelerator opening speed skid detection coefficient (DAGMARK), and the slope angle skid detection coefficient (AGGMARK), and output the product thus calculated, as the skid detection threshold (GMARG). Let us say that the smallest value among the skid detection thresholds thus input to the acceleration threshold selection means 144I is 0.3 G. Furthermore, let us say that the acceleration threshold selection means 144I receive the slope angle skid detection coefficient (AGGMARK) of 1, because the vehicle is being driven on a level slope. Furthermore, let us say that the acceleration threshold selection means 144I receive an accelerator opening speed skid detection coefficient (DAGMARK) of 0.7. In this case, the acceleration threshold selection means 144I calculate the product of 0.3 G, 1, and 0.7, thereby outputting a skid detection threshold (GMARG) of 0.21G.

The present invention is not restricted to such an arrangement in which the skid detection threshold (GMARG) is calculated based upon all the skid detection thresholds obtained by the aforementioned skid detection threshold calculation means 144A through 144H. Also, an arrangement may be made in which the skid detection threshold (GMARG) is calculated based upon the throttle opening skid detection threshold (TVGMARG) alone, for example.

The reason for this is as follows. In general, the driver performs accelerator operation with a small throttle opening under a low friction coefficient road condition in order to prevent a skid of the wheels, for example. The aforementioned arrangement calculates the skid detection threshold (GMARG) based upon the throttle opening skid detection threshold (TVGMARG) alone, giving consideration to this fact. Specifically, with the aforementioned arrangement, the throttle opening skid detection threshold (TVGMARG) is reduced corresponding to the throttle opening, i.e., reduction in the throttle opening. In almost all cases, such an arrangement can detect that a skid of the wheels has occurred at a low acceleration of the vehicle. Now, let us say that an electronic control throttle is employed. With such an arrangement, while the accelerator opening does not match the throttle opening, the accelerator opening is reduced corresponding to reduction in the throttle opening. Accordingly, an arrangement may be made in which the accelerator opening skid detection threshold (APGMARG) is reduced corresponding to reduction in the accelerator opening, instead of the aforementioned arrangement in which the skid detection threshold is reduced corresponding to reduction in the throttle opening. Such an arrangement has a function of detecting the skid at a low acceleration of the vehicle in the same way.

Also, under a low friction coefficient road condition, the driver may start the vehicle not only in the first gear but also in the second gear, for example. The start of the vehicle in the second gear exhibits an increased engine revolution, but leads to a reduced driving force, as compared with the start of the vehicle in the first gear. In order to handle such a situation, an arrangement may be made in which the wheel driving force skid detection threshold (TQGMARG) is reduced corresponding to reduction in the wheel driving force, thereby enabling detection of a skid of the wheels at a low acceleration of the vehicle.

Furthermore, the acceleration threshold calculation means may be switched according to the prevailing conditions.

Next, description will be made regarding the operation of the R skid electric motor torque target value correction means 134 included in the electric motor torque target value calculation means of the vehicle driving force system according to the present embodiment with reference to FIGS. 17A and 17B.

Figure 17A:
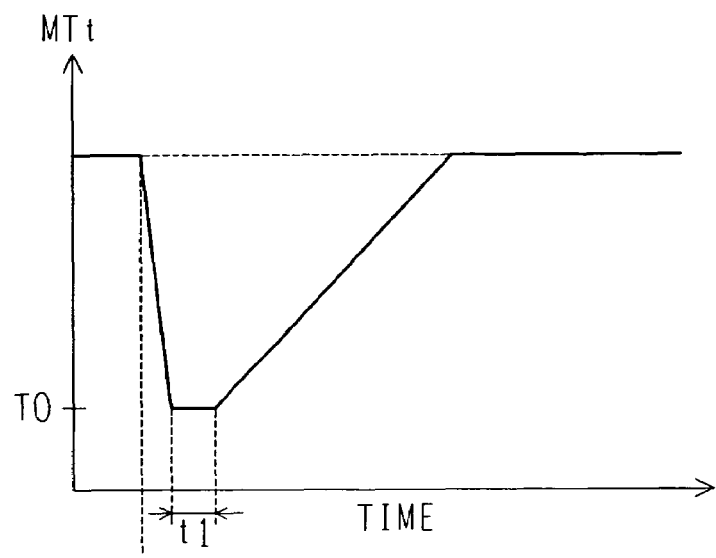
FIGS. 17A and 17B are timing charts which show the operation of R skid electric motor torque target value correction means included in electric motor torque target value calculation means of a vehicle driving force system according to an embodiment of the present invention.
Figure 17B:
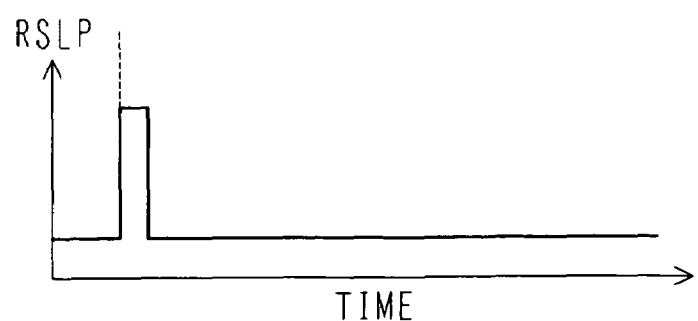

FIGS. 17A and 17B are timing charts which show the operation of the R skid electric motor torque target value correction means included in the electric motor torque target value calculation means of the vehicle driving force system according to an embodiment of the present invention.

As shown in FIG. 4, the R skid electric motor torque target value correction means 134 receive the output signal from the R skid detection means 140 and the output signal from the torque switching means 133, as input signals. In the event that the R skid detection means 140 have detect the skid of the rear wheels, the R skid electric motor torque target value correction means 134 correct the target electric motor torque (MTt) value output from the torque switching means 133 so as to effect recovery from the skid of the rear wheels.

FIG. 17B shows the rear skid flag RSLP which is an output signal from the R skid detection means 140. In a case of the rear skid flag RSLP of 0, i.e., in a case that determination has been made that a skid of the wheels has not occurred, the R skid electric motor torque target value correction means 134 do not correct the target electric motor torque (MTt) value. In a case of a rear skid flag RSLP of 1, i.e., in a case that determination has been made that a skid of the wheels has occurred, the R skid electric motor torque target value correction means 134 correct the target electric motor torque (MTt) value. In FIG. 17A, the broken line indicates the target electric motor torque before correction. On the other hand, the solid line indicates the target electric motor torque after correction.

Specifically, let us say that the rear skid flag RSLP is set to 1 as shown in FIG. 17B. In this case, the R skid electric motor torque target value correction means 134 reduce the target electric motor torque (MTt) value to T0 as indicated by the solid line shown in FIG. 15A.

The target value T0, to which the driving torque is to be reduced, is calculated beforehand such that the vehicle can recover from the skid of the wheels in a sure manner. For example, the target torque T0 is set to 0.3 Nm.

Upon reduction in the target electric motor torque (MTt) value to T0, the R skid electric motor torque target value correction means 134 maintains the target torque T0 applied to the driving wheels where the skid has occurred. Specifically, the R skid electric motor torque target value correction means 134 maintain the target driving torque T0 of the rear wheels thus reduced during a period of time of t1 as shown in FIG. 17A. The period of time t1 during which the reduced target value of the driving torque T0 is maintained is set to 0.1 sec, for example. With the present embodiment, the target driving torque is reduced to a predetermined value, and this reduced target value of the driving torque is maintained during a predetermined period of time. This enables the vehicle to recover from the skid of the wheels in a sure manner.

After recovery from the skid of the wheels, the R skid electric motor torque target value correction means 134 increase the torque applied to the driving wheels where the skid had occurred. Specifically, the R skid electric motor torque target value correction means 134 increase the target electric motor torque after correction until the target electric motor torque after correction (indicated by the solid line) matches the target electric motor torque before correction (indicated by the broken line).

As described above, with the control method according to the present embodiment, a skid of the wheels is detected under a low friction coefficient road condition as follows. That is to say, in a case that a predetermined condition is satisfied, the skid detection threshold is reduced. This enables detection of a skid of the wheels in a sure manner even in a case that the wheels are being driven at a low acceleration. Furthermore, such a control method, in which the skid detection threshold is reduced in a case that a predetermined condition is satisfied, has the advantage of preventing error in detection of the skid of the wheels. Furthermore, this enables traction control while detecting a skid of the wheels, thereby enabling stable driving of the vehicle. As described above, with the control method for detecting a skid of the wheels according to the present embodiment, the wheel driving force system exhibits improved precision of detection of a skid of the wheels, as well as preventing error in detection of a skid of the wheels. Furthermore, this enables traction control while detecting the skid of the wheels. This improves the stability, start performance, and hill-climbing ability of the vehicle.

What is claimed is:

1. A vehicle driving force system used for a vehicle having a configuration in which a driving force output from a driving source is transmitted to wheels, comprising:
    wheel speed detection means for detecting the wheel speed of said vehicle;
    acceleration calculation means for calculating the acceleration of each wheel based upon the wheel speed detected by said wheel speed detection means;
    acceleration skid detection means having a function of determining whether or not a skid of the wheels has occurred based upon the comparison result between the acceleration of the wheels obtained by said acceleration detection means and a predetermined skid-detection acceleration threshold for detection of a skid of the wheels; and
    acceleration threshold adjustment means which selects as a basis for calculating said predetermined skid-detection acceleration threshold a smallest value from skid-detection acceleration thresholds derived from the throttle opening of the engine, the accelerator opening, the accelerator opening speed, the engine revolution, the driving force, the wheel speed, and the slope angle of the road.

2. A vehicle driving force system according to claim 1, further including speed-reduction determination means for determining whether or not the speed of said vehicle is being reduced,
    wherein said skid-detection is stopped during a period of time in which said speed-reduction determination means determine that the speed of said vehicle is being reduced.

3. The vehicle driving force system of claim 1, wherein in a case that the acceleration of the wheels is greater than a first wheel acceleration, the driving force of the driving source is controlled such that the acceleration of the wheels is reduced to said first wheel acceleration,
    and wherein in a case that the acceleration of the wheels is smaller than a first wheel acceleration, the driving force of the driving source is controlled such that the acceleration of the wheels matches a second wheel acceleration which is smaller than said first wheel acceleration.

4. A vehicle driving force system used for a vehicle having a configuration in which a driving force output from a driving source is transmitted to wheels, at least one of a plurality of wheels is driven by an internal combustion engine, and at least one of the other wheels is driven by a electric motor, comprising:
    a power supply for said electric motor;
    a control device including control means having a function of controlling said electric motor so as to control the output from the electric motor applied to said wheels for handling a skid of the wheels,
    wheel speed detection means for detecting the wheel speed of said vehicle;
    acceleration calculation means for calculating the acceleration of each wheel based upon the wheel speed detected by said wheel speed detection means;
    acceleration skid detection means having a function of determining whether or not a skid of the wheels has occurred based upon the comparison result between the acceleration of the wheels obtained by said acceleration detection means and a predetermined skid-detection acceleration threshold for detection of a skid of the wheels; and
    acceleration threshold adjustment means which selects as a basis for calculating said predetermined skid-detection acceleration threshold a smallest value from skid-detection acceleration thresholds derived from the throttle opening of the engine, the accelerator opening, the accelerator opening speed, the engine revolution, the driving force, the wheel speed, and the slope angle of the road,
    wherein in a case that the acceleration of the wheels is greater than a first wheel acceleration, said control means control the driving force of said electric motor such that the acceleration of the wheels is reduced to said first wheel acceleration,
    and wherein in a case that the acceleration of the wheels is smaller than a first wheel acceleration, said control means control the driving force of said electric motor such that the acceleration of the wheels matches a second wheel acceleration which is smaller than said first wheel acceleration.

* * * * *

UNITED STATES PATENT AND TRADEMARK OFFICE
CERTIFICATE OF CORRECTION

| | | |
|---|---|---|
| PATENT NO. | : 7,650,216 B2 | Page 1 of 1 |
| APPLICATION NO. | : 11/349971 | |
| DATED | : January 19, 2010 | |
| INVENTOR(S) | : Itoh et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 548 days.

Signed and Sealed this

Twenty-eighth Day of December, 2010

David J. Kappos
*Director of the United States Patent and Trademark Office*